United States Patent [19]

Collins

[11] 4,026,680
[45] May 31, 1977

[54] AIR SEPARATION BY ADSORPTION

[75] Inventor: John J. Collins, Katonah, N.Y.

[73] Assignee: Union Carbide Corporation, New York, N.Y.

[22] Filed: June 20, 1975

[21] Appl. No.: 588,821

Related U.S. Application Data

[63] Continuation-in-part of Ser. No. 519,267, Oct. 30, 1974, abandoned.

[52] U.S. Cl. .................... 55/26; 55/62; 55/75; 55/179; 55/208; 55/389
[51] Int. Cl.² .................... B01D 53/04
[58] Field of Search ........... 55/23, 24, 25, 26, 58, 55/62, 68, 75, 208, 269, 80, 387, 179, 389

[56] References Cited

UNITED STATES PATENTS

| 3,164,453 | 1/1965 | Milton | 55/75 X |
|---|---|---|---|
| 3,224,168 | 12/1965 | Gregory | 55/208 |
| 3,242,641 | 3/1966 | Makin, Jr. | 55/75 X |
| 3,282,028 | 11/1966 | Berlin | 55/75 X |
| 3,499,053 | 3/1970 | Asher et al. | 55/75 X |
| 3,564,816 | 2/1971 | Batta | 55/75 X |
| 3,636,679 | 1/1972 | Batta | 55/75 X |
| 3,734,293 | 5/1973 | Biskis | 55/208 X |
| 3,738,087 | 6/1973 | McCombs | 55/58 |

OTHER PUBLICATIONS

"HX Automatic Dryer," Pall Corporation, Cortland, N.Y., 1963.

Primary Examiner—Frank A. Spear, Jr.
Assistant Examiner—Robert H. Spitzer
Attorney, Agent, or Firm—John C. LeFever

[57] ABSTRACT

In an adiabatic pressure swing system for air separation by selective adsorption in at least two zeolitic molecular sieve beds in which the coldest gas temperature in the depressed temperature section adjacent the inlet end is no warmer than 35° F and the $\Delta T$ at least 50° F, heat is transferred thereto by metal solid conduction within the bed at rate sufficient to maintain such temperature at least 20° F warmer but less than 110° F.

12 Claims, 18 Drawing Figures

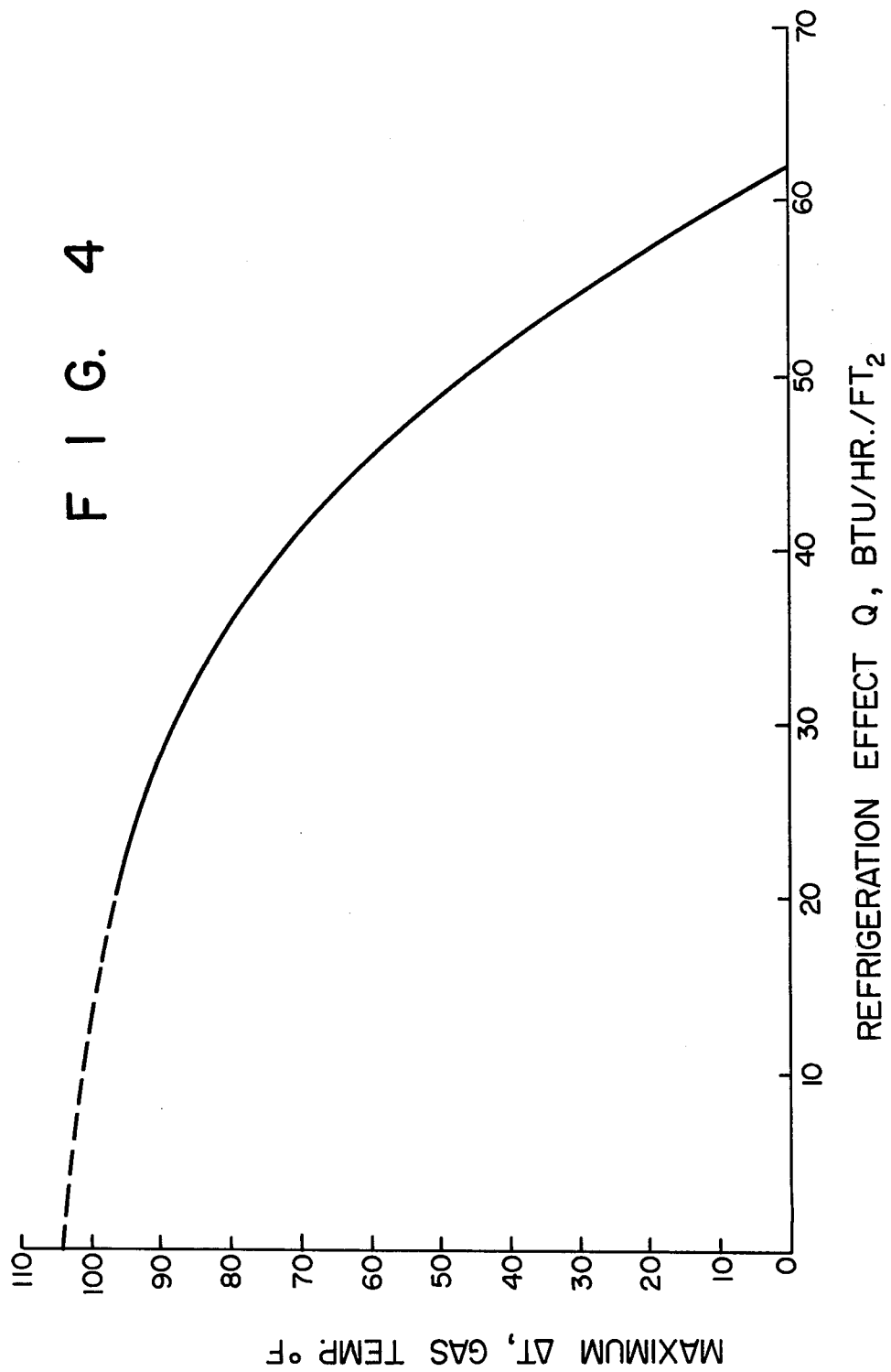

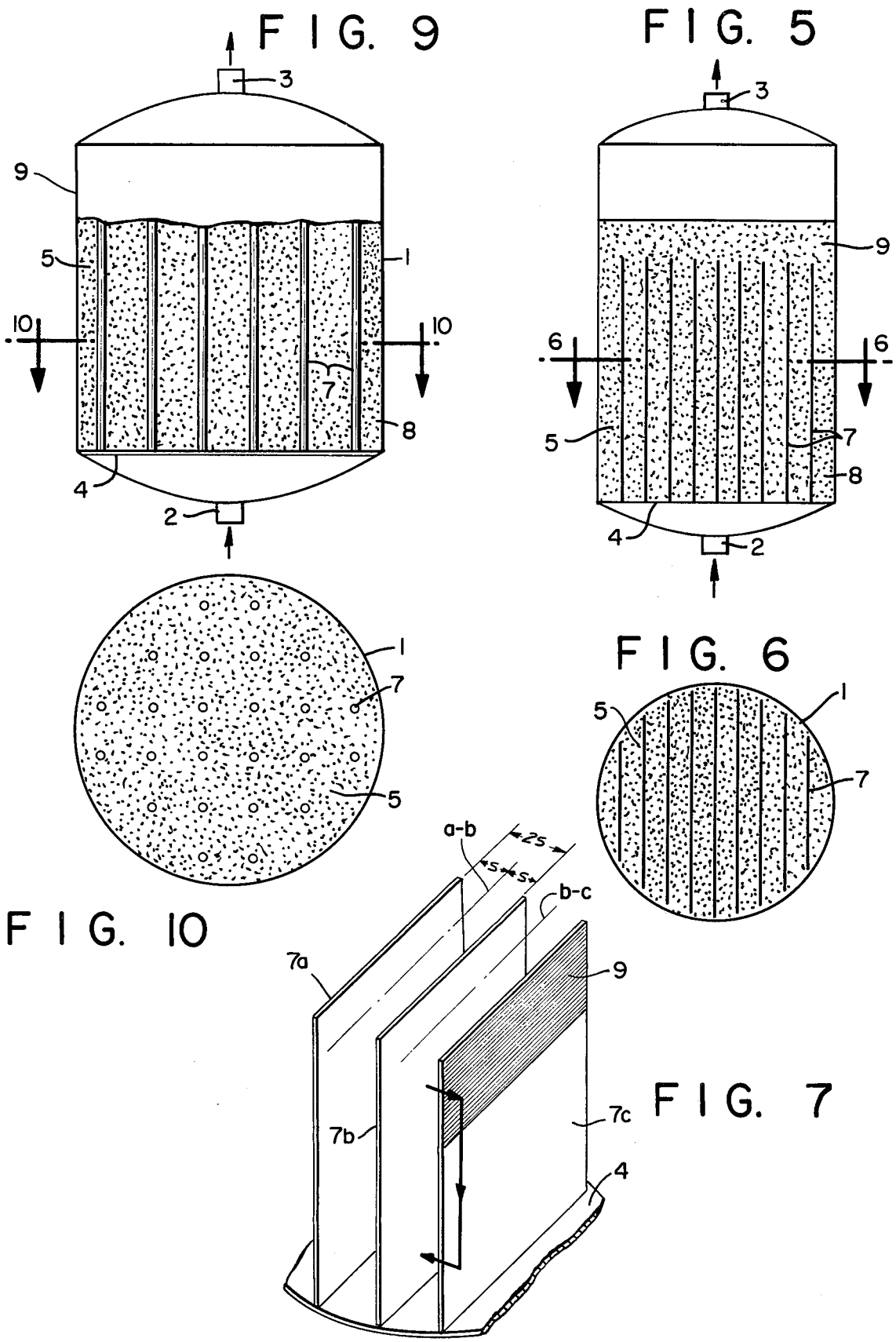

| Cycle Time, Seconds | ADSORBER Bed B | Bed A | Pressure Change in Bed A psig |
|---|---|---|---|
| 0-10 | Press. Equal. | Repressure | < 1-20 |
| 10-30 | Cocur. Depress. | Repressure | 20-32 |
| 30-35 | Counter. Depress. | Repressure | 32-35 |
| 35-60 | Purge | Repressure | 35-40 |
| 60-70 | Repressure | Press. Equal. | 40-20 |
| 70-90 | Repressure | Cocur. Depress. | 20-10 |
| 90-95 | Repressure | Counter. Depress. | 10-1 |
| 95-120 | Repressure | Purge | < 1- |

Feed      Product

AIR SEPARATION BY ADSORPTION

RELATED APPLICATIONS

This application is a continuation-in-part of application Ser. No. 519,267 filed Oct. 30, 1974, now abandoned, entitled "Air Separation by Adsorption".

BACKGROUND OF THE INVENTION

This invention relates to a process of an apparatus for separating air by adiabatic pressure swing adsorption.

In the prior art adiabatic pressure swing processes for air separation, the cycle sequence usually includes a selective adsorption step during which compressed air is introduced at the adsorbent bed inlet end thereby forming a nitrogen adsorption front, nitrogen being selectively adsorbed by most adsorbents as for example, zeolitic molecular sieves. Oxygen is also coadsorbed but substantially displaced by the more strongly held nitrogen adsorbate. Oxygen effluent gas is discharged from the opposite or discharge end of the bed at about the feed air pressure and the nitrogen adsorption front moves progressively toward the discharge end. The adsorption step is terminated when the front is intermediate the inlet and discharge ends, and the bed is cocurrently depressurized with oxygen effluent being released from the discharge end and the nitrogen adsorption front moving into the previously unloaded section closer to the discharge end. The cocurrent depressurization gas may in part be discharged as oxygen product and in part returned to other adsorbent beds for a variety of purposes, e.g. purging and pressure equalization with a purged bed for partial repressurization thereof. Cocurrent depressurization is terminated before the front reaches the discharge end so that the oxygen purity of the effluent is nearly that of the gas discharged during the preceeding adsorption step as for example described more completely in Kiyonaga U.S. Pat. No. 3,176,444.

The cocurrently depressurized bed is usually further depressurized by releasing waste gas through the inlet end, i.e. countercurrently depressurized, until the bed pressure diminishes to a desired low level for purging. Then oxygen purge gas is flowed through the bed to desorb the nitrogen adsorbate and carry some out of the system. The purged and at least partly cleaned bed is then repressurized at least partly with oxygen and/or feed air and returned to the adsorption step. One such process delivering product oxygen at nearly the feed air pressure is described in Batta U.S. Pat. No. 3,564,816, and requires at least four adsorbent beds arranged in parallel flow relation. Another process delivering product oxygen at lower, slightly above atmospheric pressure is described in Batta U.S. Pat. No. 3,636,679, and requires at least three beds arranged in parallel flow relation. Still another process requiring any two adsorbent beds arranged in parallel flow relation is described in McCombs U.S. Pat. No. 3,738,087. The latter process includes an increasing pressure adsorption step of introducing feed air to the inlet end of the partially repressurized adsorption bed at pressure higher than the aforementioned intermediate pressure, selectively adsorbing nitrogen and simultaneously discharging oxygen gas, all at relative rates such that the pressure of the adsorption bed rises from the intermediate pressure during this step to higher pressure at the end of such step.

In pilot plant tests relatively high oxygen recoveries were obtained with both three bed and four bed systems. For example, in a front bed calcium zeolite A system in which the bed diameter was 6 inches and the feed air was supplied at 70° F and cycled according to the teachings of the aforementioned Batta U.S. Pat. 3,564,816, at 90% O$_2$ product purity the oxygen recovery was 45.5%. However, in commercial-scale equipment composed of calcium zeolite A beds 26 inches in diameter, the O$_2$ recoveries were substantially less than expected, i.e. 39.4% and 42.3% at air feed temperature of 50° F and 78° F, respectively. Also, in a commercial size three bed calcium zeolite A system (26 inch bed diameter) in which the feed air was supplied at temperature of 40° F, the O$_2$ recovery was less than expected. The system stabilized at a product purity of only 66% and with an oxygen recovery of only 26.7%. Moreover, at feed air temperature of 110° F, the oxygen recovery was only 33.6%.

An object of this invention is to provide an improved adiabatic pressure swing process for air separation which permits oxygen recoveries in commercial size equipment which are equivalent to those obtained in small pilot plant equipment.

Other objects will be apparent from the ensuing disclosure and appended claims.

SUMMARY

This invention relates to an adiabatic pressure swing process of an apparatus for selectively adsorbing nitrogen from feed air to provide oxygen effluent product.

One of the more important characteristics of an adsorbent is the selectively it exhibits for the components of a multi-component system. Crystalline zeolitic molecular sieves of at least four Angstroms pore size coadsorb oxygen and nitrogen from air, but selectively adsorb nitrogen relative to oxygen. It is known that this selectivity is temperature sensitive and certain prior art suggests that in the crystalline zeolitic molecular sieve-nitrogen-oxygen system, the selectivity for nitrogen imporves somewhat with increasing temperature, at least up to room temperature. However, Heinze U.S. Pat. 3,719,205 teaches that temperature exerts an opposite effect by stating that with calcium zeolite A (Molecular Sieve 5A), the separation efficiency of an adsorption oxygen enrichment decreases with increasing temperature.

Another important characteristic of adsorption processes is adsorbent utilization or capacity for the adsorbate; it is known that utilization normally decreases with an increase of adsorption temperature. Karwat U.S. Pat. No. 3,355,859 teaches that in a pressure swing adsorption air separation process employing calcium zeolite A, it is necessary to take into consideration that the selectivity of the adsorption material for nitrogen at lower temperature is lower than at room temperature, while the amount of gas adsorbed thereby is much greater than at room temperature. The patentee also states that a satisfactory oxygen enrichment is achieved if in this case an adsorption temperature of $-100°$ C and 60° C and preferably about $-70°$ C. However, Skarstrom U.S. Pat. No. 3,237,377 states that room temperature is preferred for air separation by pressure swing adsorption using zeolitic molecular sieve adsorbent.

To resolve the conflicting prior art teachings regarding the effects of temperature for adiabatic pressure swing adsorption, air separation studies were conducted on the nitrogen-oxygen-calcium zeolite A system, and FIG. 1 graphically summarizes these studies along with similar studies for sodium zeolite A (Molecular Sieve 4A) and sodium zeolite X (Molecular Sieve 13X). Zeolite A is described in U.S. Pat. No. 2,882,243; the as-synthesized sodium form has an apparent pore size of about four Angstrom units and the calcium exhanged form has an apparent pore size of about five Angstrom units. Zeolite X, another synthetic crystalline zeolite molecular sieve is described in U.S. Pat. No. 2,882,244; the as-synthesized sodium zeolite X has an apparent pore size of about ten Angstrom units. In FIG. 1, the sodium zeolite A curve is shown by a dashed line, the calcium zeolite A curve is shown by a solid line and the sodium zeolite X curve is shown by a dash-dot-dash line. In general, the curves show that percent oxygen recovery increases with increasing temperature from 0° F up to a maximum of about 90° F and thereafter diminishes with further increasing temperature.

Significantly, the aforementioned four inch diameter, four bed system tested at 70° F feed air temperature yielding 45% oxygen recovery is on the calcium zeolite A curve, but the commercial size 26 inch system is substantially below the oxygen recovery predicted from the curve and based on the feed air temperatures.

The prior art has taught that in adiabatic pressure swing processes (which by definition occur without loss or gain of heat), the end-to-end bed temperature should be uniform. Recognizing that the heat effects of adsorption and desorption produce cyclic temperature swings in the bed, each active particle of adsorbent absorbs heat and rises in temperature during adsorption. During desorption, the particle releases heat and is recooled. At steady state, the quantity of fluid adsorbed by a particle equals the quantity desorbed; also the quantity of heat absorbed equals the heat released and the temperature rise equals the temperature fall. Therefore, over each full cycle the net change in temperature is zero and the adiabatic concept should be applicable to every local zone of the active adsorbent bed. Disregarding these cyclic temperature swings, the prior art has assumed that each adsorbent particle throughout the bed undergoing pressure swing adsorption experiences a uniform average temperature substantially equal to the temperature of the entering feed air.

Contrary to the prior art teachings of uniform adsorbent bed temperature during pressure swing air separation, it has been unexpectedly discovered that these thermally isolated beds experience a sharply depressed temperature zone in the adsorption bed inlet end. As used herein, "thermally isolated" means that the beds are not physically joined to each other for heat transfer there between, and the inlet end of the zeolite molecular sieve adsorbent bed is that portion to which the feed air is introduced and which adsorbs substantially all of any contaminants contained in the air feed i.e. $CO_2$ and water. The inlet end of the bed includes 30% of the full bed length, and is measured from the point of air feed introduction and extending in the direction of air flow towards the discharge end at which the oxygen product emerges. In most instances, the inlet and discharge ends of the adsorbent bed are integral; however, the feed end may be physically separated from the remainder of the bed as long as both portions are directly joined from the fluid standpoint. This means that each part experiences the same process step at the same time.

In some instances, the aforementioned depressed temperature zone in the inlet end has been observed to experience temperature drops on the order of 100° F below the feed air temperature. By way of example, the lowest curves in FIG. 2 show that with a feed air temperature of 38° F, a temperature as low as −66° F was measured a distance of one foot from the inlet end support screen. FIG. 2 also shows that such temperature depression exists when the feed air is relatively warm, i.e. 95° F. It is believed that the inlet end temperature depression is most severe in those systems which experience an inadvertent heat regenerative step at such end. Such heat-regenerative step serves to cyclically receive and store the chilling effect of desorption during counterflow periods of the process and to cyclically return the chilling effect to the bed during forward flow periods of the air separation process. When raw air which has not been pretreated is employed as feed, a water-loaded zone develops in this region and essentially no oxygen-nitrogen separation occurs therein. For purposes of this invention, the inlet end temperature depression may be characterized as producing a temperature difference within the inlet end (between the point at which feed air is introduced and the coldest point) of at least 50° F and with the coldest temperature within the inlet end being no warmer than 35° F. The temperature depression as hereinbefore described does not occur in adsorbent beds of less than 12 inches effective diameter. As used herein, effective diameter refers to the minimum cross-sectional dimension of an adsorbent bed. In smaller beds, there is sufficient heat inleak to the adsorbent such that the atmospheric heat moderates the depression and the process is not truly adiabatic. Also, the inlet end temperature depression does not develop unless the feed air is separated to produce at least 60% oxygen. With lesser oxygen-nitrogen separations, the chilling effect of desorption is not sufficient to develop the aforementioned depression. Although there will always be a degree of depression irrespective of bed effective diameter or degree of oxygennitrogen separation. In such instances, the depression is not sufficient to substantially reduce the oxygen recovery and require the practice of this invention.

In the process of this invention, heat is transferred to the inlet end by metal solid conduction from both the adsorbent bed inlet and the bed section downstream the inlet end at rate sufficient to maintain the gas flowing therethrough at temperature at least 20° F warmer than such without such metal solid conduction heat transfer, but less than 110° F. As used herein, "adsorbent bed inlet" refers to the bed location at which feed air is introduced and which is proximate to the bed support means, as for example a metal screen. The adsorbent bed inlet is at essentially the temperature of the feed air. The effect of this inlet end heating is to move the adsorbent temperature to a higher level along the curves of FIG. 1 and thereby increase the percent oxygen recovery towards the maximum possible value. The aforementioned temperature comparisons should be based on measurements at the same point of time in the cycle and at the same location in the adsorbent bed. If there is a significant variation in the temperature difference through the inlet end, the measurements should be made in the region of lowest absolute temperature and greatest difference, as for example in the one foot bed depth region of the FIG. 2 system. In another process embodiment of this invention, feed air is introduced at temperature less than 90° F and heat is transferred to the inlet end by both an external heating source and by metal solid conduction. As described in my copending patent application Ser. No. 519,267, the heat to be added may be introduced as sensible heat in warm process streams entering the feed air inlet end of the adsorbent bed. In most pressure swing adsorbent air separation processes, the feed air is compressed to superatmospheric pressure and the heat of compression is more than adequate to supply the aforementioned inlet end heating. Adsorbent beb inlet end heating may also be achieved by introducing externally generated heat to the air feed, as for example with a shell-tube heat exchanger employing steam as the heating medium. Simularly, the external heat may be introduced to a recycled process stream from the discharge end of the adsorbent beds, as for example heating oxygen by an external source prior to introduction at the feed air inlet end for partial repressurization of a purged bed at low pressure.

More specifically, the broadest process aspect of this invention relates to an adiabatic pressure swing process for air separation by selectively adsorbing at least nitrogen alternately in at least two thermally isolated crystalline zeolite molecular sieve adsorption beds of at least four Angstroms apparent pore size at ambient temperature wherein the feed air is introduced to the inlet end of a first adsorption bed at high pressure and at least 60% oxygen discharges from the discharge end of the bed. The first bed is cocurrently depressurized and the cocurrent depressurization is terminated when the first bed is at lower pressure. Part of such oxygen from the cocurrent depressurization is returned or recycled for repressurization of another purged adsorption bed. Waste gas is released from the first bed inlet end thereby countercurrently depressurizing same to a lowest pressure and then oxygen gas is introduced from another adsorption bed discharge end to the first discharge end as pruge gas for desorption of the nitrogen adsorbate, the adsorbate-containing purged gas being discharged from the first bed inlet end as waste gas. Oxygen gas from the discharge end of an other-than-first adsorption bed is introduced at above said lowest pressure to the purged first bed for at least partial repressurization thereof. In this prior art air separation process the aforedescribed gas flows are such that a depressed temperature section is formed in the first bed inlet end wherein the coldest temperature is no warmer than 35° F and the temperature difference between said coldest gas temperature and a warmest gas temperature within the first bed is at least 50° F. Under these conditions the aforedescribed depressed temperature zone substantially reduces the oxygen recovery from the process. In this invention, heat is transferred to the inlet end by metal solid conduction from both the adsorbent bed inlet and the bed section downstream the inlet end at rate sufficient to maintain the gas flowing therethrough at temperature at least 20° F warmer than such gas without such metal solid conduction heat transfer but less than 110° F. In a preferred embodiment, heat is transferred to the inlet end at rate of 15 to 150 BTU/hr/sq. ft. bed cross-sectional area.

In the apparatus aspect of this invention, there are at least two thermally isolated crystalline zeolitic molecular sieve adsorbent beds of at least four Angstroms apparent pore size arranged and constructed for alternate flow of feed air to the inlet end of each adsorbent bed and discharge of at least 60% oxygen from the discharge end thereof. The improvement comprises a multiplicity of metallic elements extending from the inlet of each adsorbent bed at least one-third the distance toward the discharge end, having a total cross-sectional area per square foot of adsorbent cross-sectional area A of $(X/K)(L/8)^2$ where $L$ is the adsorbent bed length (in feet), $K$ is the thermal conductivity of said metallic elements (in BTU/hr. ft.$^2$ °F/ft.), and $X$ is the product KA for an 8 foot long adsorbent bed with values between 0.5 and 12, said metallic elements being spaced across the adsorbent cross-sectional area such that the distance between each adsorbent particle and the closest metallic element is less than 7 inches. The metallic elements may for example comprise metal plates or metal rods, and may extend from the inlet to the discharge end of each adsorbent bed.

The heat source for the bed inlet end depends on the distance the metallic elements extend towards the adsorbent bed discharge end. By way of example, if the metallic elements only extend one-third of this distance, at least most of the heat is transferred to the bed inlet end from the adsorbent bed inlet. If the metallic elements extend the entire distance to the bed discharge end, a significant part of the inlet end heat is derived from bed section downstream the inlet end.

It is also contemplated that the metallic elements may have minor discontinuities in the longitudinal direction, i.e. short gaps.

As will be hereinafter demonstrated, this invention significantly improves the oxygen recovery from adiabatic pressure swing adsorption air separation systems.

BRIEF DESCRIPTION OF THE DRAWNGS

FIG. 4 is a graph showing refrigeration rate and the maximum temperature difference in a zeolite 5A bed during air separation.

FIG. 5 is a schematic longitudinal cross-section view of a vessel with an adsorbent bed provided with plate-type metallic elements spaced parallel to each other across the bed cross-section, according to the apparatus of this invention.

FIG. 6 is an end view of the FIG. 5 apparatus taken along line 6—6.

FIG. 7 is an isometric view of three plate-type metallic elements showing the spacing and heat transfer relationships.

FIG. 9 is a schematic longitudinal cross-section view of a vessel with an adsorbent bed provided with rod-type metallic elements.

FIG. 10 is an end view of the FIG. 9 apparatus taken along line 10—10.

DESCRIPTION OF PREFERRED EMBODIMENTS

A series of tests were conducted to determine the rate of cooldown in the inlet end of a three bed adsorbent system of the type illustrated in Batta U.S. Pat. No. 3,636,679 (FIG. 7). The calcium zeolite A beds were 57-inch diameter circular cross-section, 8 feet long and each contained 5700 lbs. of 1/16-inch adsorbent pellets. The thermally isolated beds were equipped with axially positioned thermocouples and cycled according to the teachings of the aforementioned Batta patent.

Figure 3:
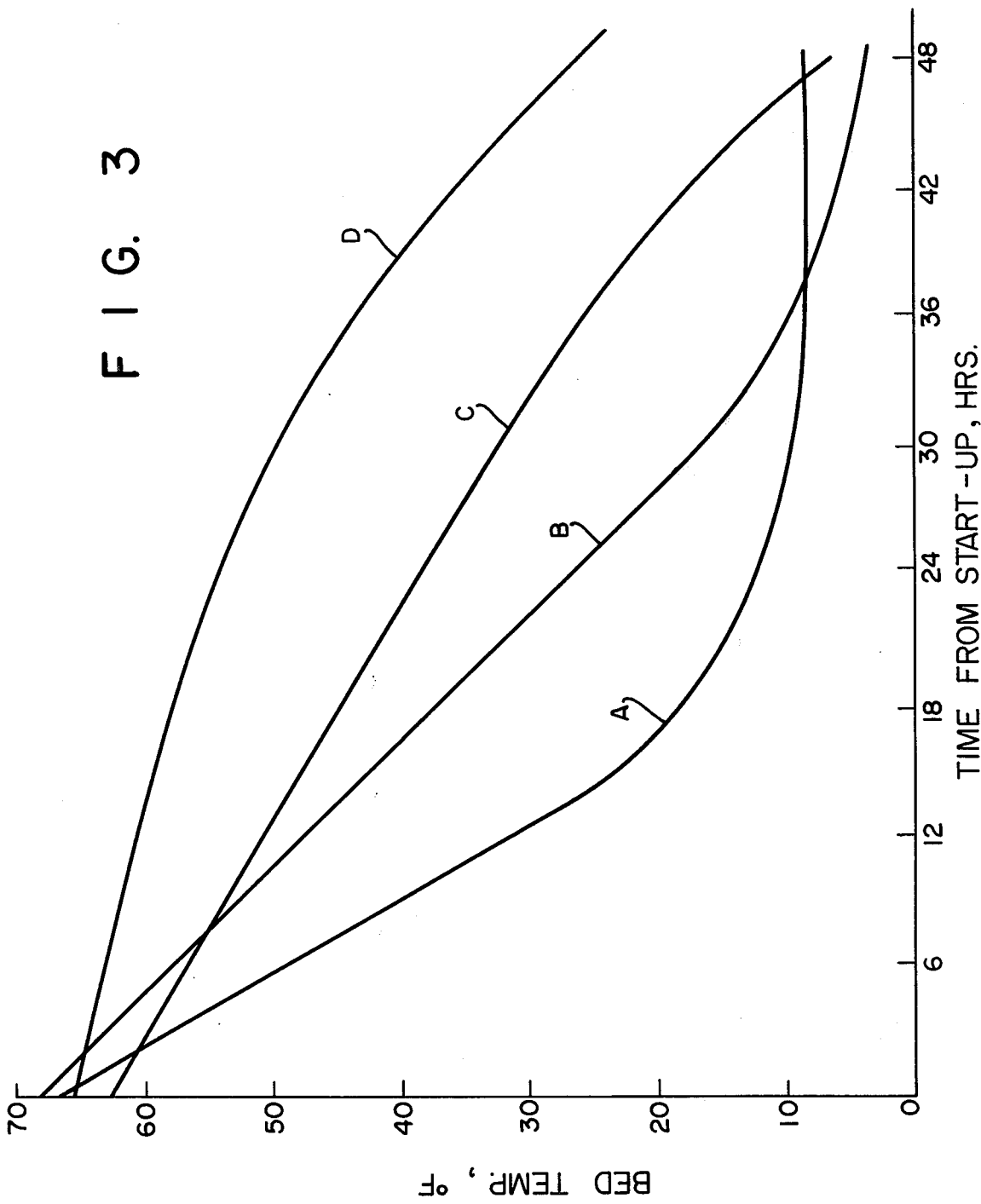
FIG. 3 is a graph showing the cooling rates of several points within the depressed temperature section of a zeolite 5A adsorbent bed during air separation startup.

FIG. 3 is a graph showing the observed adsorbent bed temperature (° F) at four different positions in the beds during the initial 48-hour period of operation based on feed air at about 110° F and 30 psig. The four positions are as follows:

| Position | Distance from Support Screen (Inlet) |
|---|---|
| A | 3 inches |
| B | 15 inches |
| C | 27 inches |
| D | 39 inches |

It will be apparent from FIG. 3 that the slope of a curve represents the instantaneous rate of cooldown for a particular bed location during the time period. Accordingly, for the initial period of operation up to about 15 hours the instantaneous rate of cooldown was highest at location A, nearest the inlet and progressively diminished to location D farthest from the inlet. At about 15 hours the location A cooldown rate began to decrease and cooldown was completed after about 36 hours. After about 30 hours the cooldown rate of the next closest location (B) began to diminish but cooldown was not yet complete after 48 hours. Locations C and D were continuing to cooldown at rapid rates after 48 hours.

The FIG. 3 data was also used to determine the average cooldown rate of the feed end during various time periods. By way of example, the cooldown rate was about 50 BTU/hr. per ft.$^2$ of bed cross-section 6 hours after startup, and declined to about 32 BTU/hr. per ft.$^2$ of bed cross-section 24 hours after startup. During the startup period the adsorbent bed temperature gradient continued to increase and stabilized after 60 hours, when the bed maximum temperature difference between the lowest temperature in the inlet end and the warmest temperature in the discharge end was about 100° F.

Figure 2:
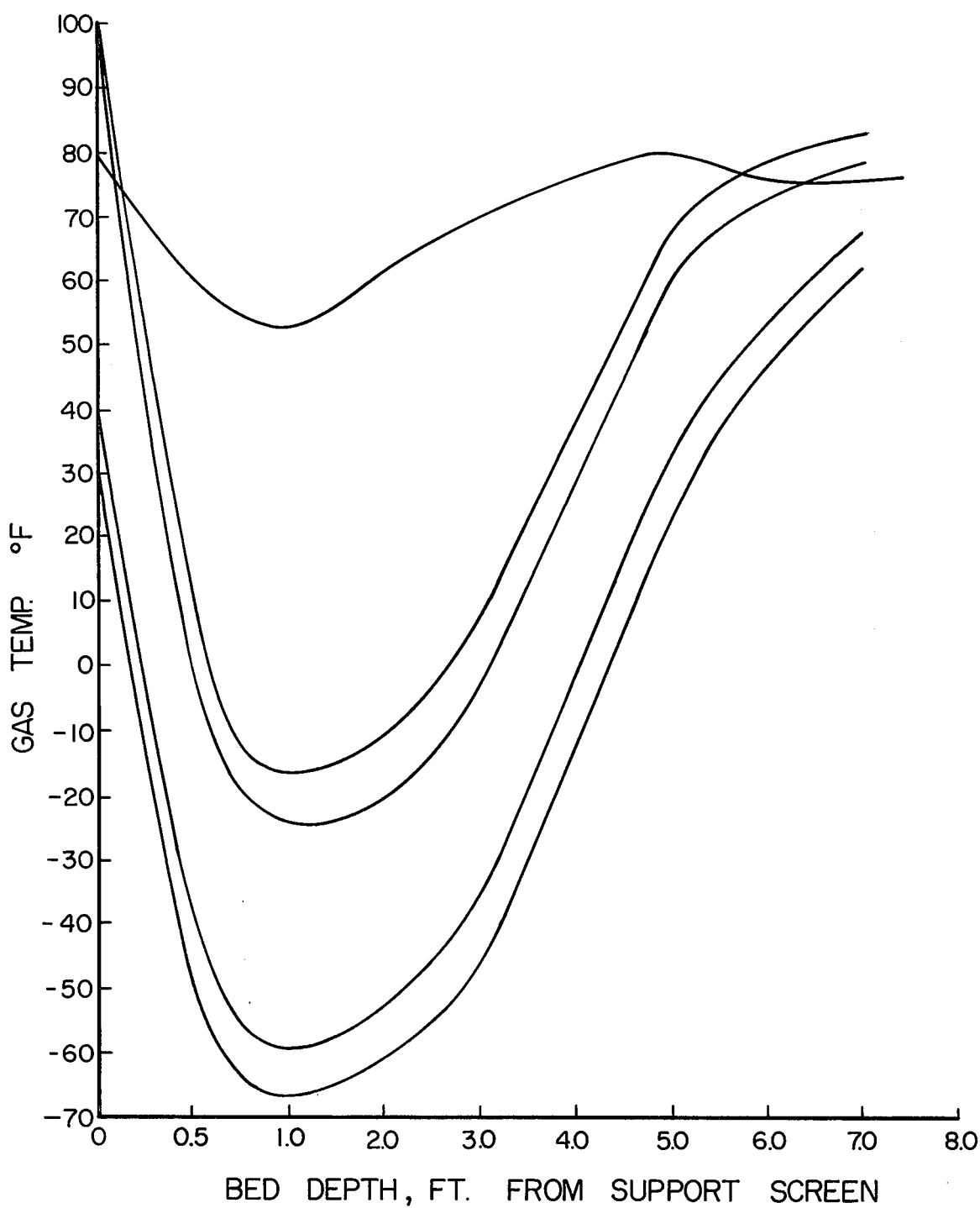
FIG. 2 is a graph showing the adsorbent bed temperature versus bed depth for prior art practice and also a three bed embodiment of the instant invention.

FIG. 4 is a graph of data from this test depicting the relationship of the cooldown rate and the maximum temperature difference in the 8-foot long beds. This relationship is an expression of a transient condition in the beds; however, it represents an indication of the quantity of heat required in the inlet end in order to stabilize the bed temperature differential at a specified level. By way of example, if it is desired to maintain a maximum ΔT of 45° F it would be necessary to introduce heat to the inlet end at the rate of 50 BTU/hr. per ft.$^2$ of bed cross-section. It should be noted in this respect that if heat is introduced to the inlet end from an external source as for example in the form of increased feed air temperature, the temperature level throughout the bed is increased. As for example illustrated by comparing the lowest and middle curves in FIG. 2, the overall temperature level in the beds is increased by raising the feed air temperature from 38° F to 95° F but the temperature difference through the beds remains about the same.

Figure 1:
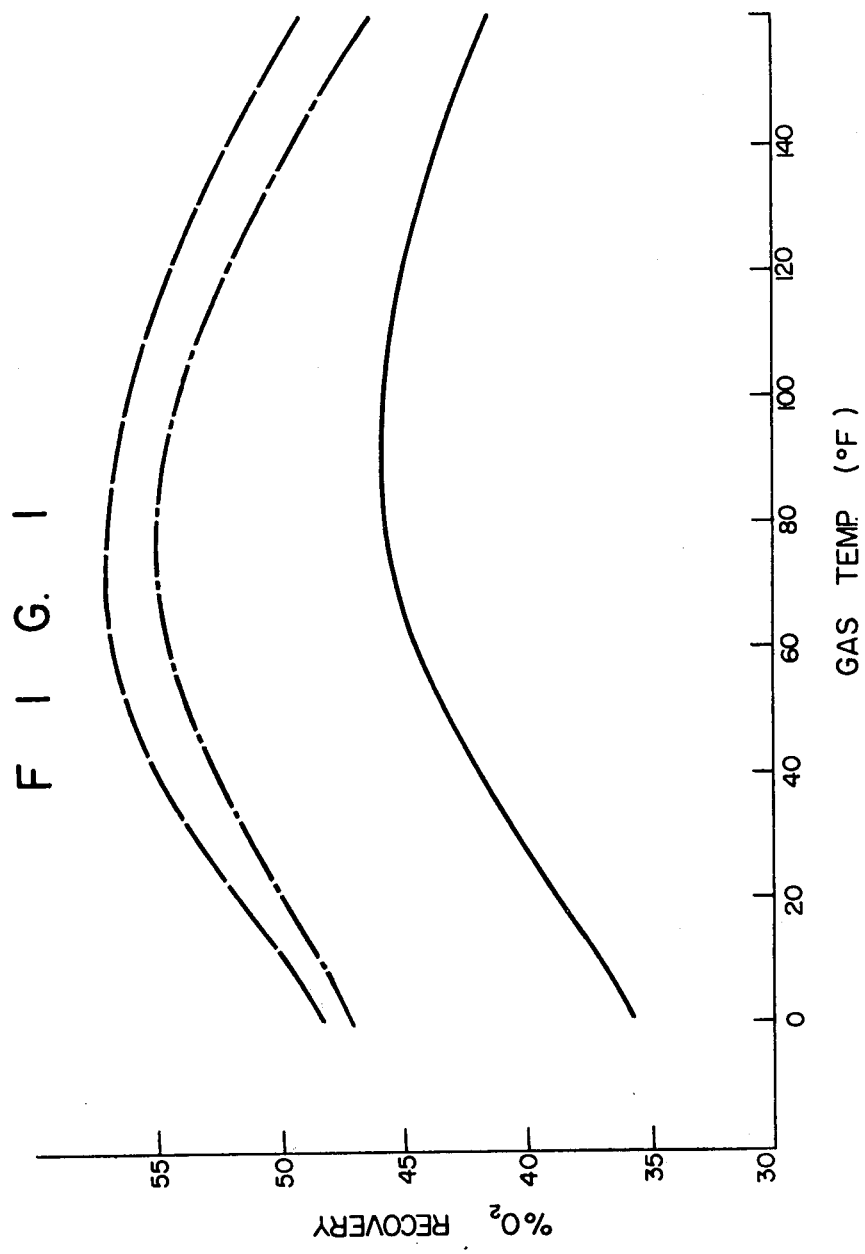
FIG. 1 is a graph showing the percent oxygen recovery versus gas temperature relationship for various forms of zeolite A and zeolite X.

This invention utilizes the same temperature difference which otherwise limits oxygen recovery efficiency, to warm the inlet end where the undesirable temperature depression normally occurs. From the process standpoint this is accomplished by transferring heat to the inlet end by metal solid conduction from both the inlet and the bed section downstream the inlet end. Both the inlet and the downstream bed section are sufficiently warmer than the depressed temperature inlet end to substantially warm the latter to a level sufficient for improved oxygen recovery if the warming is at least 20 F about the coldest temperature in the inlet end absent the practice of this invention. Since the aforementioned coldest temperature is no warmer than 35° F, this location is warmed to at least 55° F and it will be apparent from FIG. 1 that performance will be on a higher portion of the zeolite adsorbent curve and the percent oxygen recovery will be significantly improved. On the other hand the warming should be less than 110° F or performance will be on a downwardly sloping portion of the zeolite adsorbent curve preferably, sufficient heat is transferred to the inlet end to maintain the gas flow therethrough at a maximum temperature between 60° F and 100° F. It should also be recognized that practice of this invention reduces but does not eliminate longitudinal temperature differences within the adsorbent beds, so that for air separation practice FIG. 1 must be considered in terms of an average gas temperature throughout the beds. Stated otherwise, it is a qualitative but not quantitive indication of percent oxygen recovery achievable by this invention.

FIGS. 5 and 6 illustrate one apparatus embodiment of the invention in which vessel 1 having a circular cross-section is vertically oriented and provided with air feed port 2 at the bottom and oxygen product discharge port 3 at the top. Bed support plate 4 as for example a metal screen is transversely positioned in the vessel lower end and retains crystalline zeolitic molecular sieve adsorbent bed 5. A multiplicity of metal plates 7 are positioned parallel to each other and equally spaced across the adsorbent bed cross-section. These plates are contiguously associated with bed support plate 4 at the adsorbent bed inlet so as to provide a solid metal-to-metal contact for heat transfer. Plates 7 extend through the bed inlet end 8 where the depressed temperature zone would otherwise be formed, preferably into the warmer downstream bed section 9. Although not illustrated, plates 7 may extend to the bed discharge end. Since the inlet end 8 may comprise up to one-third the bed length, plates should preferably extend at least one-half of the bed length to insure adequate heat transfer from warmer section 9 to inlet end 8. In a preferred embodiment, plates 7 are formed of 1/32 to ¼ inch thick aluminum, equally spaced at 1½ to 8 inch intervals across the adsorbent bed cross-section.

In FIG. 7, three plates $7a$, $7b$, and $7c$ are positioned parallel to each other with $7a - 7b$, and $7b - 7c$ spaced at distance $2S$. Dotted plane a-b represents the planar mid-point between plates $7a$ and $7b$, and dotted plane b-c represents the planar midpoint between plates $7b$ And $7c$. In practice, the heat is transferred by solid conduction from product end 9 or the feed air downstream section of each plate (the upper shaded section of plate $7c$) to the inlet end section of each plate (the lower shaded section of plate $7c$) as illustrated by the arrows. This heat encounters five series resistances:

1. The resistance imposed by a radial depth of bed in the warm section of the adsorbent bed.
2. The film resistance at the surface of that portion of a metallic element of the apparatus which is in the warm section of the adsorbent bed (the upper shaded section of plate $7c$).
3. The resistance imposed by the metallic element itself.
4. The film resistance at the surface of that portion of the metallic element which is in the cool inlet end of the adsorbent bed (the lower shaded section of plate $7c$).
5. A resistance imposed by a radial depth of adsorbent bed in the cool inlet end.

Based on recognition of these heat transfer resistances, it has been discovered that the apparatus of this invention must be provided with metallic elements having certain characteristics in terms of total cross-sectional area per square foot adsorbent cross-sectional area A, adsorbent bed length L (in feet), thermal conductivity K (in BTU/hr. ft.$^2$ ° F/ft.), and X is the product KA for an 8 foot long adsorbent bed, and spacing relative to the adsorbent particles. In particular, X should have values between 0.5 and 12, A should be $(X/K)(L/8)^2$ and the metallic elements are spaced across the adsorbent bed cross-sectional area such that the distance S between each adsorbent particle and the closest metallic element is less than 7 inches.

Figure 8:
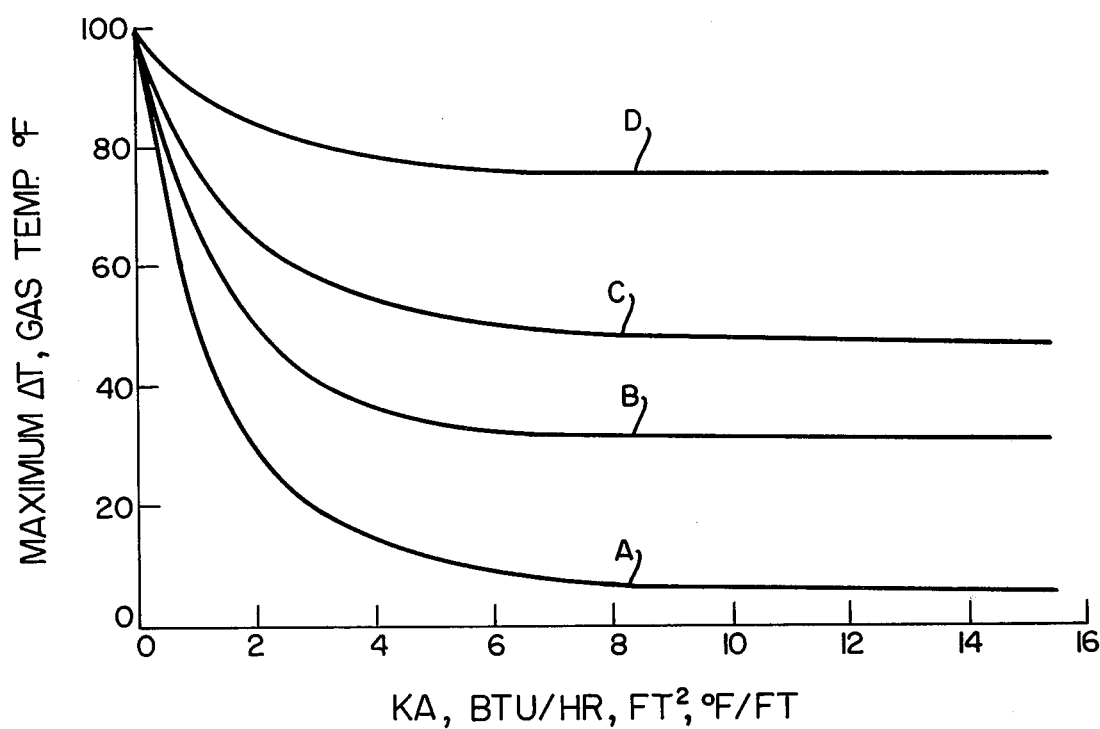
FIG. 8 is a graph showing the relationship between maximum temperature difference and KA values for various spacings of FIG. 5-7 parallel plate-type metallic elements.

FIG. 8 is a graph showing the interrelationship of these variables for the FIG. 5–7 parallel plate-type metallic elements at four different S spacings as follows: A = 1 inch, B = 4.5 inches, C = 6 inches and D = 9 inches, all in an adsorbent bed length L of 8 feet and when feed gas temperature was about 90° F. In general, the graph shows that smaller maximum gas temperature differences can be maintained at smaller S spacings. The graph also shows that the maximum gas temperature difference becomes relatively insensitive to continued increase in the product KA above a KA value 12.0 BTU/ft./hr. ° F, ft.$^2$, and that with KA less than 0.5 the thermal resistance imposed by the plate-type elements predominates and controls the heat transfer rate. Under these circumstances the system would be relatively insensitive to spacing S and satisfactory performance cannot be achieved with reasonably spaced elements, i.e. spacing of 1 inch or greater. In a preferred embodiment, X is between 1 and 6.

It will be apparent from FIG. 8 that if the S spacing is greater than about 7 inches, the maximum gas temperature difference in a bed will exceed about 60° F and the potential improvement in percent oxygen recovery by the practice of this invention would be very limited. On the other hand, S spacings of less than 1 inch are to be avoided for mechanical and cost reasons, and spacings of 1 to 3 inch are preferred as a balance between ease of fabrication and heat transfer rate.

The FIG. 8 relationship is directly applicable to beds of 8 foot length. For different bed lengths the heat transfer resistance imposed by the metallic elements of this invention is altered by reason of the change in length over which the heat is transferred. In fact the heat transfer resistance is directly proportional to the length of the metallic element. Accordingly, the KA required for a bed length L is L/8 times the KA required for an 8 foot long bed.

It should also be understood that adiabatic pressure swing processes are usually designed for operation at a specific cycle time and the air feed rate is adjusted for maximum bed utilization. With bed length L the feed rate is L/8 times the feed rate employed for an 8 foot bed. Accordingly, the heat transferred or fluxed in the bed by the gas flow is also L/8 times the heat fluxed in an 8 foot bed and the KA of the metallic elements must be altered accordingly. To accommodate both the change in heat transfer resistance and the change in quantity of heat transfer, the KA for a bed of length L is $(L/8)^2$ times the KA required for an 8 foot bed.

Use of FIG. 8 is illustrated by the following example: Assume that it is desired to limit the maximum temperature difference of gas flowing through a 10 foot long calcium zeolite A adsorbent bed system for air separation to 40° F so as to achieve about 90% oxygen and the feed temperature is about 90° F. Assume further that aluminum plates (K = 130) are to be placed in the beds of circular cross-section and at uniform S spacing of 2.25 inch, i.e. 4.5 inch center-to-center distance between adjacent plates. From FIG. 8 and based on a ΔT ordinate of 40° F, a KA value about 2 may be obtained by extrapolation between the A and B curves. Since K equals 130, A is about 0.0154 for an 8 foot long bed. The value of A for the desired 10 foot bed may now be calculated from the formula $X/K$ $(L/8)^2$ as follows: $(2/130)(10/8)^2 = 0.024$ total cross-sectional square feet of aluminum plate per square foot of adsorbent cross-sectional area. Since there are 12/4.5 = 2.67 plates per square foot of adsorbent cross-sectional area, the aluminum plate thickness should be (12) (0.024) /2.67 = 0.108 inch.

Figure 11:
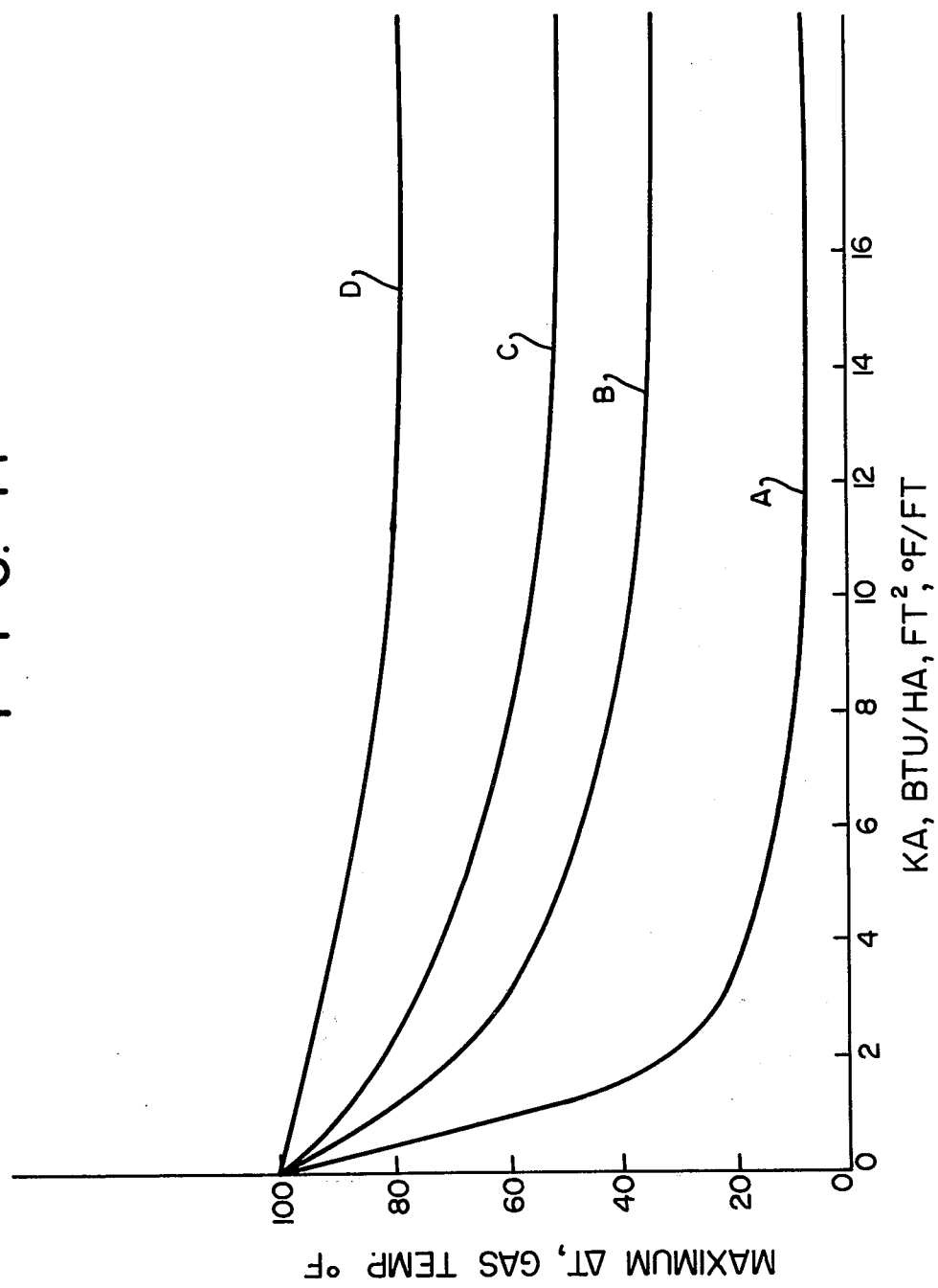
FIG. 11 is a graph showing the relationship between maximum temperature difference and KA values for various spacings of FIG. 9–10 rod-type metallic elements.

FIGS. 9 and 10 illustrate another apparatus embodiment in which rods comprise the metallic elements 7 arranged in a square pattern, and the FIG. 11 graph shows the interrelationship between the aforementioned variables for such rods in a manner comparable to FIG. 8 for the plate-type metallic elements. Again the adsorbent bed length is 8 feet and the S spacings are as follows: A = 1 inch, B = 4.5 inches, C = 6 inches and D = 9 inches. The rods are arranged in the square pattern of FIG. 10 and the S spacing is one-half the diagonal distance across the square.

A comparison of FIG. 11 with FIG. 8 reveals that the general relationships are the same and that a spacing greater than 7 inches should be avoided for the previously discussed reason. In a preferred embodiment, they are formed of aluminum of one fourth to 1 inch diameter and uniformly spaced across the adsorbent beds at 0.01 to 0.10 square foot total cross-sectional area per square foot of adsorbent area.

Figure 12:
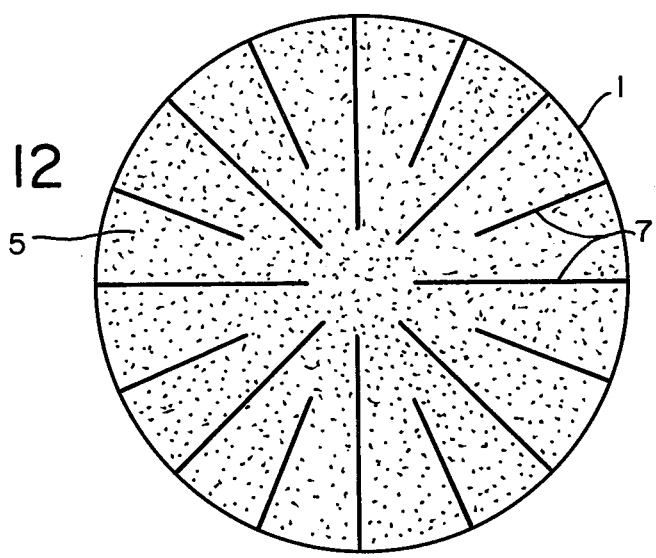
FIG. 12 is an end view of an adsorbent bed with plate-type metallic elements being radially disposed in the axial direction.

FIG. 12 illustrates another configuration for plate-type metallic elements, wherein the plates 7 are radially disposed in the axial direction of the adsorbent beds 5. Their outer edges are equally spaced around the perimeter of the adsorbent beds.

Other suitable forms of metallic elements include a series of members arranged concentric with each other around the longitudinal axis of the bed, in spaced relation with adsorbent material packed therebetween. They may for example have circular or square cross-sections, normal to the bed longitudinal axis.

Figures 13, 14:
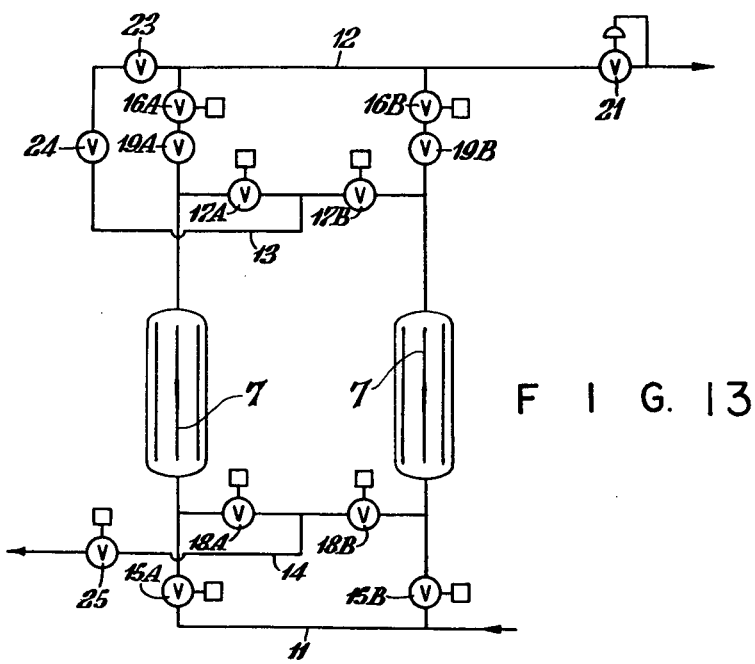
FIG. 13 is a schematic flowsheet of apparatus according to the invention, suitable for air separation in each of two adsorbent beds in parallel flow sequence to produce oxygen.
FIG. 14 is a preferred cycle and time program for practice with the two bed FIG. 13 apparatus.

Any, for example, of the aforedescribed systems for transferring heat to the inlet end of an adiabatic pressure swing system for air separation by metal solid conduction can for example be practiced in the two, three and four bed embodiments of FIGS. 13-18. By way of example FIGS. 13-14 illustrate a two bed system as described in McCombs U.S. Pat. No. 3,738,087 incorporated to the extent pertinent.

In this type of process, the purged adsorption zone at the lowest pressure level is partially repressurized to an intermediate pressure by introducing oxygen gas. The process is characterized by an increasing pressure adsorption step of introducing feed air to the inlet end of the partially repressurized adsorption zone at pressure higher than said intermediate pressure, selectively adsorbing nitrogen and simultaneously discharging oxygen from the zone discharge end, with the feed gas introduction, the nitrogen adsorption and the oxygen discharge at relative rates such that the pressure of the adsorption zone rises from the intermediate pressure during this step to higher pressure at the end of such step.

Stated otherwise, during the increasing pressure adsorption step the net molal rate of gas introduction to the adsorption zone is greater than the net molal rate of gas adsorption on the bed. In this relationship, "net molal rate of gas introduction" is the rate at which feed air is introduced minus the above-zero rate at which gas is discharged from the bed, and the "net molal rate of adsorption" is the rate at which gas passes into the adsorbed phase minus the rate at which components of the feed are displaced or otherwise released from the adsorbed phase. When the net molal rate of gas introduction exceeds the net molal rate of gas adsorption, the adsorption pressure will rise. This may be accomplished by restricting the discharge of oxygen gas relative to the inflow of feed. The increasing pressure adsorption step preferably continues until the highest pressure level of the process has been attained and the nitrogen adsorption front has moved from the adsorption zone inlet end to a position intermediate the inlet and discharge ends. The location of the one component adsorption front is such that a substantial portion of the zone length downstream of the front is unused, i.e. not yet significantly loaded with the one component. The adsorption zone is thereafter cocurrently depressurized for sufficient duration to move the nitrogen adsorption front to the zone discharge end. During this period, oxygen is released from the zone and may be used to repressurize or purge another adsorption zone, and/or be discharged as product. In this manner, the adsorbent is fully utilized and maximum recovery of the less strongly adsorbed components is achieved at high purity.

Each step in the cycle of bed A will now be outlined and related to those components of FIG. 13 which are involved in the cycle changes. Pressures illustrative of such operation for air separation using calcium zeolite A adsorbent are included and are related to the following terms used herein to identify the terminal pressure in a relative sense:

| Term | Illustrative psig. |
|---|---|
| lowest pressure | <1 |
| lower intermediate pressure | 10 |
| equalization pressure | 20 |
| higher intermediate pressure | 32 |
| highest intermediate pressure | 35 |
| highest pressure | 40 |

Time 0-10: Bed A is being repressurized from the lowest process pressure (less than 1 psig.) to the equalization pressure (20 psig.), and bed B is being pressure equalized. Valves 15A and 16A are open and valves 17A and 18A are closed. Feed air is introduced to bed A at its inlet end from manifold 11 through valve 15A and one component-depleted gas from manifold 12 is simultaneously introduced at the bed A discharge end through valve 16A. The latter is derived from bed B undergoing pressure equalization through trim valve 19B, valve 16B, and flows consecutively through valves 16A and trim valve 19A into bed A. Bed B is cocurrently depressurized during this period and the flow continues for about 10 seconds until pressures between beds A and B are substantially equalized at about 20 psig. During this period, the flow of equalization gas is rapid while the flow of feed air from the compressor is limited, so that the major portion of the gas for repressurizing bed A from 0 to 20 psig. is one component-depleted gas, e.g. 85% for air separation. During this period, another part of the gas released from bed B is discharged as product in manifold 12.

Time 10-30: Valve 16A is now closed and flow of feed air only continues to bed A for an additional twenty seconds to a higher intermediate pressure of about 32 psig. Simultaneously the bed B cocurrent depressurization continues and all of the nitrogen-depleted gas released therefrom is discharged as product in manifold 12. During this period the bed B pressure diminishes from 20 psig. (equalization) to 10 psig. (lower intermediate). During the bed B pressure equalization and cocurrent depressurization steps, the nitrogen adsorption front has moved progressively toward the bed discharge end, and at this point has reached the discharge end so that breakthrough is imminent. Therefore it can no longer deliver product purity gas to manifold 12 and valve 16B closes. In order for product flow to be uninterrupted, the product gas must be derived from bed A, and in this process the latter delivers product during the remainder of its repressurization.

Time 30-35: Valve 16A again opens and flow of product proceeds from bed A to manifold 12. This is the first part of the bed A increasing pressure adsorption step and the bed pressure rises from 32 psig. (higher intermediate) to 35 psig. (highest intermediate). Simultaneously valve 18B opens, waste discharge valve 25 closes and bed B is counter-currently depressurized through its inlet end to less than 1 psig., the lowest pressure of the process.

Time 35-60: During this remaining part of the bed A increasing pressure adsorption step wherein the bed pressure rises from 35 psig. (highest intermediate) to 40 psig. (highest), valves 17B and 25 are open and part of the nitrogen-depleted gas discharged from bed A flows through valves 23 and 24 and 17B to purge bed B.

At the beginning of the bed A 0–10 second repressurization through both the inlet and discharge ends, a nitrogen adsorption front is established near the inlet end. This front moves progressively toward the discharge end during the remainder of the 10 second period and during the succeeding repressurization steps for the first 60 seconds of the cycle. At the end of this period, a predetermined length of unloaded bed (unused by nitrogen) remains between the nitrogen adsorption front and the discharge end.

Time 60-70: Valve 15A closes and valve 16B is opened and bed A now commences pressure equalization with bed B while continuing to deliver product. Bed A is cocurrently depressurized by releasing gas from the discharge end. The gas flows through the unloaded bed length wherein the nitrogen component is absorbed and the emerging nitrogen-depleted gas is employed in two parts. Oxygen product gas flows through control valve 21 in manifold 12 to the consumer conduit downstream valve 21 at a rate serving to hold the consumer conduit at a suitable low pressure such as 3 psig. The remainder and major part of the nitrogen-depleted gas flows through valves 16B and 19B to the discharge end of bed B for partial repressurization thereof. Bed B has previously been purged of nitrogen adsorbate and is initially at the lowest pressure level of the progress. This flow of one component-depleted gas from bed A to bed B continues for about 10 seconds until the two beds are at substantially the same equalization pressure of 20 psig. During this step valve 15B is open and bed B is also being repressurized through its inlet end with feed air from manifold 11.

Time 70-90: Valve 16B closes and additional nitrogen-depleted gas is released from the bed A discharge end for cocurrent depressurization to about 10 psig. (lower intermediate), the entire quantity of this gas from bed A being discharged as product. Simultaneously only the feed air flow is continued to the bed B inlet end for further repressurization thereof from 20 psig. to 32 psig.

Time 90-95: Bed A is now countercurrently depressurized to the lowest process pressure by closing valves 15A, 16A, opening valve 18A and closing valve 25 so the nitrogen desorbate is released through waste manifold 14. Simultaneously valve 16B opens and nitrogen-depleted gas emerges from the bed B discharge end for flow through manifold 12 and valve 21 as product. This is the first part of the bed B increasing pressure adsorption step wherein the bed presure rises from 32 to 35 psig. during nitrogen adsorption from feed air flowing through the bed.

Time 95-120: Valves 17A and 25 open and part of the nitrogen-depleted gas emerging from bed B is returned from manifold 12 through valves 23 and 24 to the bed A discharge end as purge gas. The latter flows through bed A countercurrently to the feed gas flow direction and desorbs the remaining nitrogen adsorbate. The resulting waste gas in discarded through valve 18A and manifold 14. Simultaneously with the bed A purging, the bed B increasing pressure adsorption step is continued until the bed pressure reaches 40 psig., the highest pressure of the process. At this point valves 17A and 18A are closed and purged bed A is again ready for repressurization in accordance with the foregoing sequence.

As previously stated, the crystalline zeolitic molecular sieves useful in the practice of this invention have an apparent pore size of at least about four Angstrom units. Crystalline zeolites having apparent pore sizes of at least 4.6 Angstroms are preferred because they permit more rapid adsorption and desorption of the nitrogen molecules particularly in the lower temperature region, leading to faster operating cycles than attainable with small pore size zeolites.

The term apparent pore size as used herein may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

The term "zeolite," in general, refers to a group of naturally occurring and synthetic hydrated metal aluminosilicates, many of which are crystalline in structure. There are, however, significant differences between the various synthetic and natural materials in chemical composition crystal structure and physical properties such as X-ray powder diffraction patterns.

The structure of crystalline zeolitic molecular sieves may be described an an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electro-valence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules. Any of this space not occupied by reduced element metal atoms will be available for adsorption of molecules having a size, shape and energy which permits entry of the adsorbate molecules into the pores of the molecular sieves.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

Among the naturally occurring zeolitic molecular sieves suitable for use in the present invention include erionite, calcium-rich chabazite and faujasite. The natural materials are adequately described in the chemical art. Suitable synthetic crystalline zeolitic molecular sieves include types A, R, X, Y, L and T. Zeolites such as types X, Y, L and chabazite are particularly useful because of their relatively large pore sizes.

Zeolite A is a crystalline zeolitic molecular sieve which may be represented by the formula:

$1.0\pm0.2 M_{2/n} 0:Al_2 O_n:1.85\pm0.5 SiO_2:yH_2O$ where M represents a metal, $n$ is the valence of M, and $y$ may have any value up to about 6. The as-synthesized zeolite A contains primarily sodium ions and is designated sodium zeolite A. All of the monovalent cation forms of zeolite A have an apparent pore size of about 4 Angstroms, excepting the potassium form which has a pore size of about 3 Angstorms and consequently is unsuitable for use in the present invention. When at least about 40 percent of the monovalent cations sites are satisified with di- or trivalent metal cations, zeolite A has an apparent pore size of about 5 Angstroms.

Zeolite R is described in U.S. Pat. No. 3,030,181.

Zeolite T has an apparent pore size of about 5 Angstroms, and is described in U.S. Pat. No. 2,950,952.

Zeolite X has an apparent pore size of about 10 Angstroms, and is described in U.S. Pat. No. 2,882,244.

Zeolite Y has an apparent pore size of about 10 Angstroms, and is described in U.S. Pat. No. 3,130,007.

Figure 15:
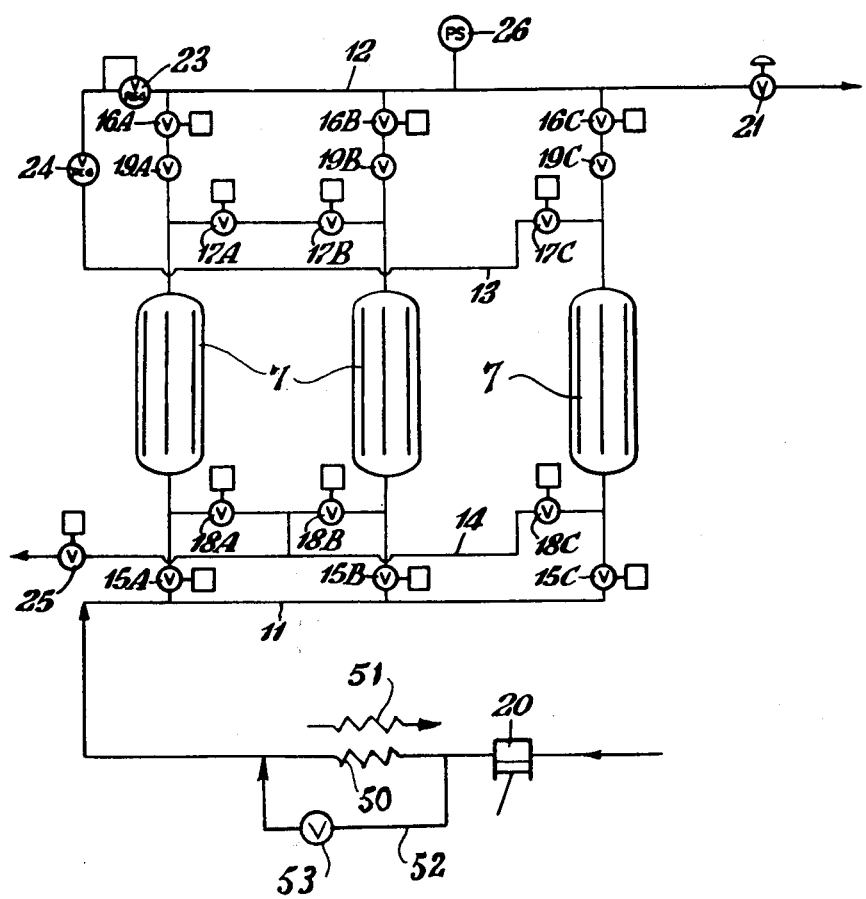
FIG. 15 is a schematic flowsheet of apparatus according to the invention suitable for air separation in each of three adsorbent beds to produce oxygen with heat from feed air compression also transferred to the depressed temperature section.

As previously stated, in one embodiment of the invention heat is transferred to the inlet end by both an external heating source and also by metal solid conduction, and means for accomplishing same are illustrated in the three bed FIG. 15 embodiment. The feed air in conduit 11 is compressed in compressor 20 and heat is introduced to the gas as heat of compression. Normally this heat is removed in an aftercooler as the adsorbent's capacity is relatively lower at relatively higher temperature. Typically this cooling is accomplished in passageways 50 by heat exchange with water in passageway 51, but since more than sufficient heat for this purpose is often introduced as heat of compression, controlled heat addition can be accomplished conveniently by selectively bypassing a portion of the compressed air around the aftercooler through conduit 52 and control valve 53 therein. Although not illustrated, another method for controlling the net heat of compression added to the feed air is by selectively cooling the total compressor discharge air. This cooling can be accomplished by regulating the cooling water temperature or cooling water flow rate.

One advantage of transferring heat to the inlet end by both methods is that smaller and/or fewer metal elements are needed in the bed. Also, less feed air heating is needed and this reduces the quantity of moisture introduced with the feed air.

Figure 16:
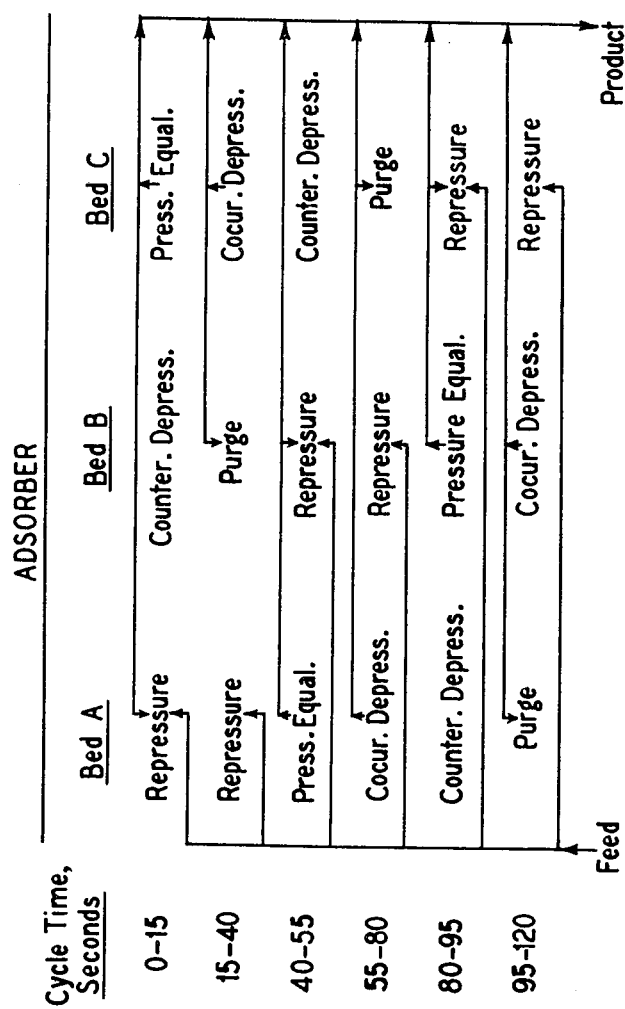
FIG. 16 is a preferred cycle and time program for practice with the three bed FIG. 15 apparatus.

FIGS. 15 – 16 illustrate a three adsorbent bed system (described in greater detail in Batta U.S. Pat. Nos. 3,636,679 and 3,717,974, and incorporated herein to the extent pertinent) which may be preferred when the oxygen product is to be consumed at only slightly above atmospheric pressure, e.g., as the aeration gas for an activated sludge waste treatment system. In the latter embodiment, at least the major part of the feed air is introduced attendant a rise in adsorbent bed pressure. The bed pressure rises because the net instantaneous rate of gas introduction (inflow minus outflow) exceeds the adsorption capability of the bed. These embodiments are distinct from those wherein at least the major part of the feed air is introduced during a steady pressure adsorption step, i.e., wherein the net rate of feed air introduction equals the adsorption capability of the bed.

Referring now to FIG. 15, it shows three adsorbent beds A, B and C connected in parallel flow relation between feed air manifold 11, oxygen effluent gas manifold 12, oxygen purge manifold 13 and waste manifold 14. Automatic valves 15A, 15B and 15C direct feed air flow respectively to first bed A, second bed B, and third bed C. Automatic valves 16A, 16B, and 16C respectively direct effluent oxygen gas from the same beds into manifold 12. Purge manifold 13 joins one oxygen effluent gas manifold 12 at discharge end of the three beds, and oxygen purge gas is introduced through automatic valves 17A, 17B, and 17C to beds A, B, and C countercurrent to the direction of feed air flow. Automatic valves, 18A, 18B, and 18C join waste manifold 14 at the inlet end of the corresponding beds for discharge of countercurrent depressurization gas and purge gas. Valves 19A, 19B, and 19C at the discharge end upstream of oxygen effluent valves 16A, 16B, and 16C respectively are the manual trim tupe for limiting the flow of pressure equalization gas.

FIG. 16 illustrates one timing sequence suitable for use with the FIG. 15 system, employing six distinct steps each involving commencement and/or termination of flows. Streams flowing into and out of the three bed system are indicated by vertical line flows in the feed manifold 11 and in the oxygen effluent gas manifold 12. The feed air manifold 11 connects horizontally with each of the three adbsorbent beds and the latter in turn join horizontally with the oxygen effluent manifold 12. The repressurization and purge steps which use a portion of the oxygen effluent are connected horizontally with the steps, e.g., cocurrent depressurization and pressure equalization which supply the returned oxygen gas. All inter-bed flows are identified on the figure.

It will be apparent from FIG. 16 that at any moment of time one of the adsorbent beds is delivering product oxygen at progressively diminishing pressure to the product manifold 12 as follows: bed C during 0–40 seconds, bed A during 40–80 seconds and bed B during 80–120 seconds. Accordingly, product oxygen flow to the consuming means is continuous.

The utilization within the system of the pressure equalization and cocurrent depressurization gas is indicated by horizontal flow lines. Each pressure equalization step is connected horizontally with a repressurization step in another bed having already been purged, and each cocurrent depressurization step is connected horizontally with a purge step of a different bed having just been countercurrently depressurized.

Each step in the cycle of bed A will now be outlined and related to those components of FIG. 15 which are involved in the cycle changes. Pressures illustrative of such operation for air separation using calcium zeolite A adsorbent are included.

Time 0–15 seconds: Bed A is being repressurized, bed B countercurrently depressurized, and bed C pressure equalized. Valves 15A and 16A are open, and valves 17A and 18A are closed. Feed air is introduced to bed A at its inlet end from manifold 11, and one component depleted gas from manifold 12 is simultaneously introduced at the bed A discharge end. The latter is derived from bed C through trim valve 19C and valve 16C, and flows consecutively through valves 16A and trim valve 19A into bed A. Bed C is cocurrently depressurized during this period and the flow continues until pressure between beds A and C is substantially equalized at about 15 psig. During this period, the flow of equalization gas is rapid while the flow of feed air from compressor 20 is limited so that the major portion of the gas for repressurizing bed A from 0 to 15 psig is oxygen gas. During this period, another part of the gas released from bed C is discharged as product oxygen in manifold 12.

Time 15–40 seconds: Valve 16A is now closed and only the flow of feed air continues to bed A until the terminal pressure of 30 psig is reached. This completes the repressurization period for bed A.

Time 40–55 seconds: The pressure equalization stem for bed A commences by closing valve 15A and opening valves 16A and 16B cocurrently depressurizing the bed by releasing the gas from the discharge end. Oxygen product gas flows through control valve 21 in manifold 12 to the product conduit downstream valve 21 at a rate serving to hold the product conduit at a suitable low pressure such as 3 psig. The remainder and major part of the oxygen gas flows through valves 16B and 19B to the discharge end of bed B for partial repressurization thereof. Bed B has previously been purged of nitrogen adsorbate and is initially at about 0 psig. This flow of product gas from bed A to bed B continues for about 15 seconds until the two beds are at substantially the same pressure, e.g., 15 psig.

Time 55–80 seconds: Additional nitrogen-depleted gas is released from the bed A discharge end for further cocurrent depressurization thereof, with one part introduced to the bed C discharged end by closing valve 16B and opening automatic valve 17C in the purge manifold for purging nitrogen at slightly above 0 psig. Valves 23 and 24 reduced the purge gas pressure to essentially one atmosphere and also hold the flow rate of purge gas constant. This, in turn, holds the total quantity of purge gas constant since the purge step is preferably a fixed length of time. The flow rate is controlled at a steady value by regulating valve 23 which holds the pressure constant between the two valves 23 and 24. The waste gas emerging from bed C inlet end flows through automatic valve 18C in waste manifold 14 and is released through automatic waste discharge valve 25. The last-mentioned valve is a flow-limiting device rather than the shut-off type. When closed, it introduces a flow restriction into the waste manifold 14 which reduces the depressurization rate to a value below that causing attrition of the adsorbent particles. However, for the discharge of purge gas, valve 25 is open to remove the restriction inasmuch as flow is already limited by valve systems 23 and 24. Another part of the additional nitrogen-depleted gas from bed A is discharged as oxygen product. During this step, the pressure of bed A and manifold 12 continues to decrease until it reaches about 11 psig, which occurs after an additional 25 seconds (80 seconds into cycle). The lowest pressure limit for cocurrent depressurization, e.g.m 4 psig, should be maintained because the pressure corresponds to imminent breakthrough of the adsorption front at the discharge end of the bed. This completes the production phase for bed A.

Time 80–95 seconds: Bed A now begins its nitrogen adsorbate rejection (desorption) phase by closing valves 16A and 17C, and opening valve 18A. Additional gas at 4 psig is released from the bed A inlet end from countercurrent depressurization thereof through waste manifold 14 and discharge valve 25. The latter valve is closed for this step in order to introduce the aforesaid restriction and avoid excessive flow rates from the bed. This step continues to essentially one atmosphere in about 15 seconds.

Time 95–120 seconds: Bed A is purged of remaining nitrogen adsorbate by opening valves 17A and 25. Additional nitrogen -depleted gas from the discharge end of bed B flows through manifold 12 through valve 23 and 24 and purge manifold 13, then through valve 17A to the bed A discharge end. The nitrogen-containing purge gas emerging through the bed A inlet end flows through valve 18A and is discharged through waste valve 25. Purging continues of 25 seconds. This completes the cycle and bed A is in a condition to commence repressurization with feed air.

Beds B and C are consecutively cycled through the aforediscussed steps with bed B entering the simultaneous feed air-product oxygen repressurization with the bed A pressue equalitzation step (time 40–55 seconds). Bed C enters the simultaneous feed air-product oxygen repressurization with the bed A countercurrent depressurization step (time 80–95 seconds). The necessary valve changing for these steps will be recognized from FIGS. 6–7 and the foregoing description. A cycle control system is necessary to initiate and coordinate these valve changes. The cycle controller may for example receive a signal from pressure sensing means in feed air conduit 11 downstream compressor 20.

Summarizing the aforedescribed three adsorption bed system which is preferred when oxygen gas product is to be discharged at low pressure, the first bed is initially at the lowest pressure and purged of nitrogen adsorbate. Feed air and oxygen gas are simultaneously introduced respectively to the first bed inlet end and discharge end. Oxygen gas is simultaneously released from the discharge end of a third bed initially at the highest superatmospheric pressure with one part discharged as product and the balance returned to the first bed discharge end for such simultaneous introduction, the gas flows continuing until the first and third beds are first higher pressure equalized. After terminating the oxygen gas introduction to the discharge end, the feed air introduction to the first bed inlet end is continued until the bed is repressurized to the highest superatmospheric pressure. Oxygen is thereafter released from the repressurized first bed discharge end with one part thereof discharged as product and the balance returned to the discharge end of a partially repressurized second bed for simultaneous introduction during feed air introduction to the second bed inlet end until the first and second beds are first higher pressure equalized. The first bed is then cocurrently depressurized to about 21 psia. The cocurrent depressurization of the first bed is continued with one part of the oxygen discharged as product and the balance returned to the third bed discharge end for purging of nitrogen adsorbate therefrom. The first bed is thereafter countercurrently depressurized and oxygen from a cocurrent depressurizing second bed is then returned to the first bed discharge end for purging thereof. The aforedescribed steps are consecutively followed with the second and third beds in accordance with the flow cycle sequence of FIG. 16.

EXAMPLE I

In experiments performed using the abovedescribed three bed system of FIGS. 15 and 16, but without inlet end warming of this invention, the beds were 96 inches long and contained in 26 inch inside diameter vessels of circular cross-section. The adsorbent was 1/16 inch pellets of calcium zeolite A. The feed was not pretreated to remove $CO_2$ and was water saturated. Each of the vessels contained 1200 lbs. of adsorbent and the system was fed air at the average rate of 9100 scfh. and at temperature of 100° F. The aforementioned highest superatmospheric pressure was 45 psia. Bed A was equipped with thermocouples located at the axis of the vessels and at spaced distances from the air inlet end to the discharge end. Beds B and C were equipped with an axially positioned thermocouple located two feet into the air inlet of the bed.

Product was extracted at the rate of 633 scfh. and analyzed for oxygen content. Continued cycling of the system resulted in a depressed temperature zone in the inlet end as depicted in the two middle curves of FIG. 2. In the latter, the curves are used to show the range of temperatures between the coldest and warmest section of the beds at the same point in time. Two curves are plotted for Example I to depict the temperature variation which is experienced at a signal point in the bed. This temperature variation is a measure of the cyclic temperature effect which is common to adiabatic pressure swing adsorption processes, and is very small as compared to the magnitude of the stable end-to-end bed temperature gradient which developed. It is significant to note that relatively little temperature drop occurs in the first few inches adsorbent bed length because this section is loaded with preferentially adsorbed air impurities (primarily water and $CO_2$) and virtually no nitrogen is adsorbed therein. The temperature drops sharply farther into the first foot of bed length to a low point about $-21°$ F at a distance one foot from the support screen, so that the temperature difference within the inlet end is 120° F. The system stabilized at a product purity of only 88% oxygen with 29.3% oxygen recovery.

EXAMPLE II

In another experiment using three bed apparatus identical to that employed in Example I, the system was fed air at an average rate of 9030 scfh. and at temperature of 38° F with 45 psia as the highest superatmospheric pressure and again without inlet end warming. Product was discharged at rate of 770 scfh. Continued cycling again resulted in a depressed temperature zone in the inlet end as depicted in the two lowest curves of FIG. 2, the lowest temperature being about $-67°$ F at a distance one foot from the support screen so that the temperature difference within the inlet end is 105° F. The system stabilized at a product purity of 66% oxygen with 26.7% oxygen recovery.

EXAMPLE III

In still another experiment, a three bed apparatus identical to that used in Examples I and II except that the adsorbent bed diameter was 24 inches, was equipped with plate-type metallic elements arranged and positioned in the manner of FIGS. 5–7. These plates were 1/16-inch thick aluminum, spaced 3 inches apart within the adsorbent bed and extended from support screen at the inlet to the top of the adsorbent bed at the product end. The total cross-sectional area of these aluminum plates per square foot of adsorbent was 0.0233 ft.$^2$ so that in the aforementioned formula (1) for A, the X factor is about 2.9.

In this experiment each of the beds contained 950 lbs. of 1/16-inch pellets of calcium zeolite A and the system was fed unprepurified air at the average rate of 5980 scfh. The system stabilized at a product purity of 93.4% oxygen with 38.4% oxygen recovery. The longitudinal gas temperature of bed A is plotted in FIG. 2 (the upper curves). Although the operating conditions are not identical to Example I they are sufficiently similar to permit comparison. It will be apparent that without practice of this invention, the coldest gas temperature in the inlet would have been about $-25°$ F and the temperature difference within the bed would have been about 120° F. With the aluminum elements the coldest gas temperature in the bed was about 52° F and the temperature difference within the inlet end was only 44° F. The oxygen product purity was increased from 88% oxygen to 93.4% oxygne and the oxygen recovery increased about 31%, a very substantial improvement.

Figure 17:
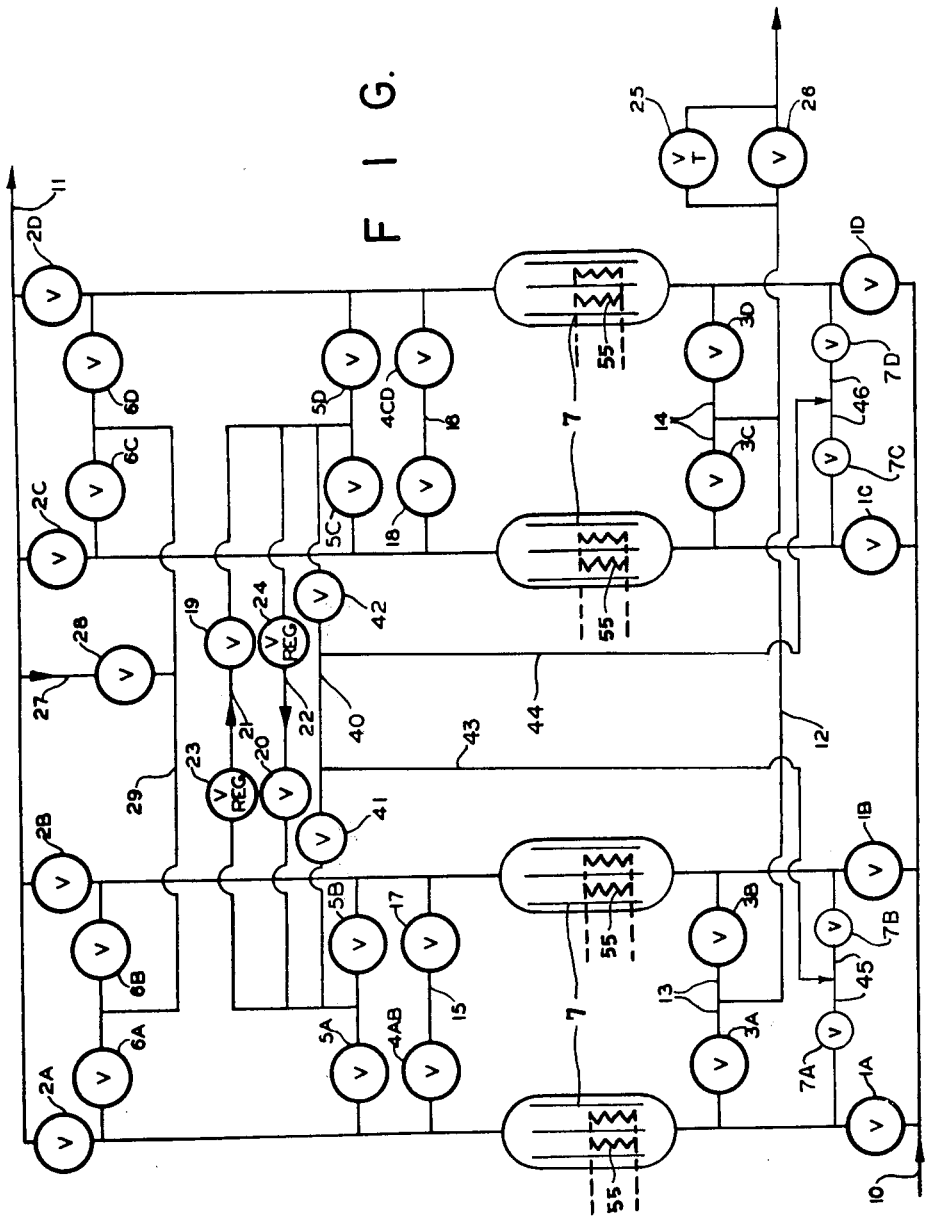
FIG. 17 is a schematic flowsheet of apparatus 18 according to the invention suitable for air separation in each of four adsorbent beds to produce oxygen with heat from embedded electric coils also transferred to the depressed temperature section.
Figure 18:
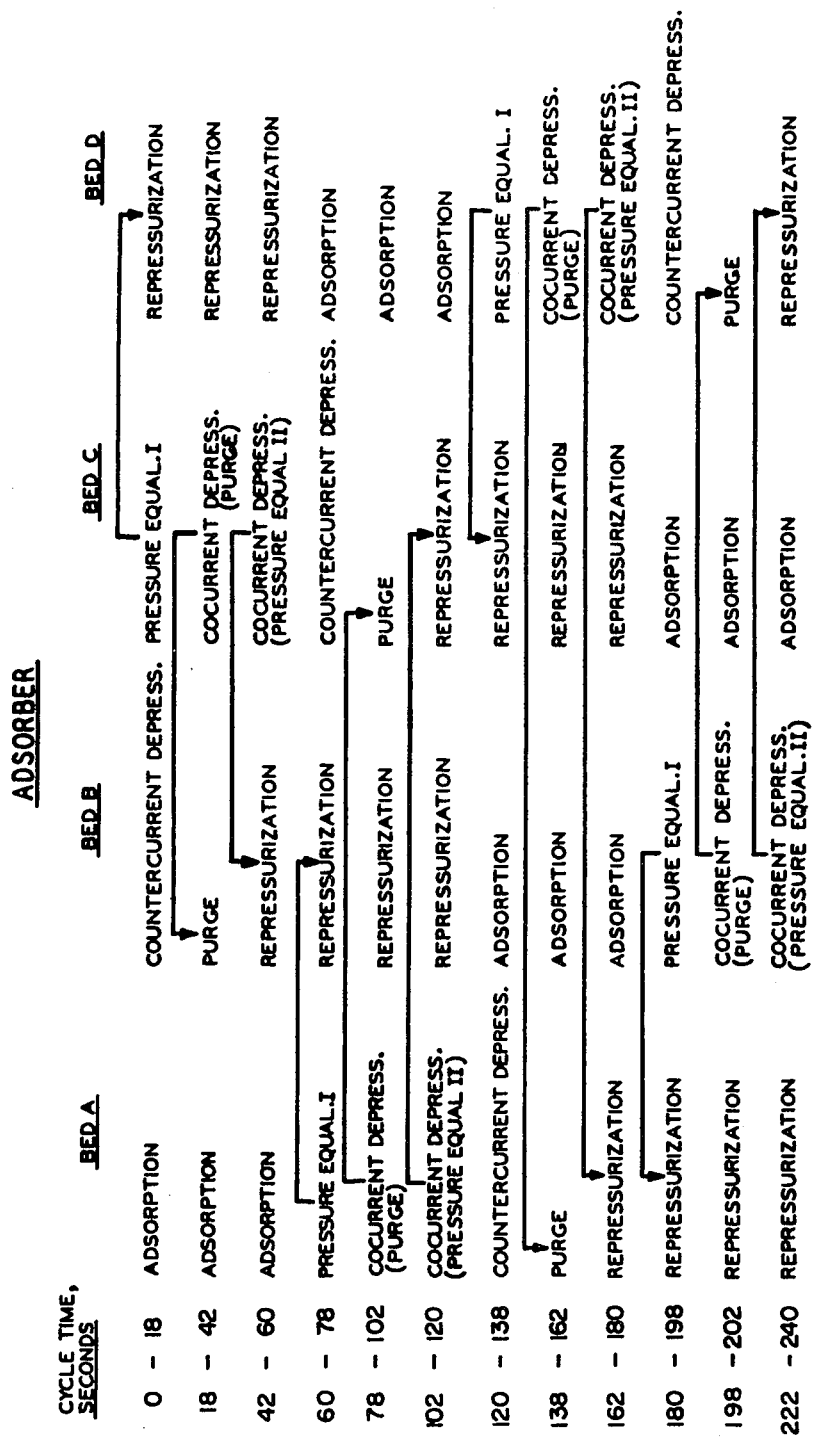
FIG. 18 is a preferred cycle and time program for practice with the four bed FIG. 17 apparatus.

In the four bed embodiment of FIGS. 17 and 18, external heat is introduced to the inlet end 8 of the adsorbent beds by electric heater or fluid-conducting tube coils 55 embedded therein. The preferred location for embedded heat exchange mechanisms is within the initial 15% of bed length The externally supplied heat can be added by any appropriate exchange mechanism as for example a shell-tube unit employing steam as the heating medium.

When the product oxygen is needed at substantially the same pressure as the feed air, a four bed system as for example described in Batta U.S. Pat. No. 3,564,816 is particularly suitable as hereinafter described and illustrated in FIGS. 17 and 18. Although the selective adsorption will be only described in terms of removing nitrogen from the feed air stream to produce oxygen, it will be understood that atmospheric impurities, primarily water and $CO_2$ but also trace amounts of light hydrocarbons, are also selectively adsorbed in preference to oxygen by crystalline zerolitic molecular sieves of at least four Angstroms pore size. These impurities are desorbed from the adsorbent bed during the low pressue purging, along with the nitrogen.

FIG. 4 shows four adsorbent beds, A, B, C and D connected in parallel flow relation between feed air manifold 10 and unadsorbed product oxygen manifold. 11. Automatic valves 1A, 1B, 1C and 1D direct feed air flow respectively to first bed A, second bed B, third bed C and fourth bed D. Automatic valves 2A, 2B, 2C and 2D, respectively, direct product oxygen from the same beds into product manifold 11.

The adsorbed nitrogen rejected by counter-current depressurization and purge through waste manifold 12 at the inlet end of the beds. Adsorbers A and B are joined at their inlet ends by conduit 13 having automatic valves 3C and 3D therein. Adsorbers C and D are joined at their inlet ends by conduit 14 having automatic valves 3C and 3D therein.

First stage equalization conduit 15 is provided joining the discharge ends of adsorbers A and B; similarly first stage equalization conduit 16 is provided joining the discharge ends of adsorbers C and D. To provide first stage pressure equalization, automatic valves 4AB and 4CD are located in conduits 15 and 16, respectively. Valves 17 and 18 in series with equalization valves 4AB and 4CD, respectively, are manual preset throttling devices which prevent excessively high flow rates from occurring and which allow adjustment and balancing of equalization rates between the adsorption bed pairs AB and DC.

Automatic valves 5A, 5B, 5C and 5D are provided at the discharge ends of the beds, two of which open together to pass cocurrent depressurization gas from one adsorbent bed for use as purge gas in another bed. Manual valves 19 and 20 in the purge cross-over conduits 21 and 22 respectively serve the same purpose as explained previously for valves 17 and 18 in the first stage pressure equalization circuit. The purge crossover conduits 21 and 22 (piped in parallel flow relation) also contain back pressure regulators 23 and 24 oriented in opposite flow directions so as to control flow in either direction between either bed A or B and bed C or D. The back pressure regulators 23 and 24 are set to maintain a minimum pressure, e.g., 50 p.s.i., in the bed undergoing cocurrent depressurization. When this pressure is reached the cocurrent depressurization and purge steps terminate. This arrangement prevents extension of cocurrent depressurization to excessively low pressure with resultant breakthrough of the one component's adsorption front.

As previously indicated, valves 17, 18, 19 and 20 are flow rate limiting devices which prevent bed damage due to excessive ΔP and fluid velocity. A similar precaution may be followed during countercurrent depressurization, by means of preset throttle valve 25 which acts as a bypass around main waste valve 26 in waste conduit 12. During countercurrent depressurization 20 the automatic main waste valve 26 is closed which forces the gas to follow the bypass route through valve 25. During the following lowest pressure purge step, valve 26 opens to minimize flow resistance in the waste conduit 12.

Repressurization conduit 27 having constant flow control valve 28 therein joins product manifold 11 for introduction of unadsorbed product effluent from the adsorber (on the absorption step) to a different adsorber having been partially repressurized to lower intermediate pressure. Conduit 27 in turn joins product return conduit 29 communicating with repressurization valves 6A–6D joining the product conduits to adsorbers A–D respectively. Cross-over conduits 43 and 44 carry the released gas from the second lower pressure equalization steps of beds A and B to beds C and D, and from the latter to the former, respectively. At the inlet end four additional sequencing valves 7A, 7B, 7C and 7D are provided in conduits 45 and 46 joining beds AB and CD, respectively.

Second stage pressure equalization conduit 40 communicates at opposite ends with the bed A discharge end through valve 5A, bed B discharge end through valve 5B, bed C discharge end through valve 5C and bed D discharge end through valve 5C and bed D discharge end through 5D. Flow conduit 41 is controlled by valves 41 and 42.

The adsorption step is terminated when the nitrogen adsorption front is entirely within the bed. This point may be determined in a manner well known to those skilled in the art, using the feed conditions, and the adsorbent's capacity and dynamic characteristics. Also the first pressure equalization step and the cocurrent depressurization step are stopped when the adsorption front is still entirely within the bed and before breakthrough. This permits removal of the nitrogen from the void space gas by adsorption within the bed discharge end, so that the emerging equalization gas and the purge gas have virtually the same purity as the product gas. If the cocurrent depressurization step is conducted before the second equalization step then all void gas recovery steps must be completed while the adsorption front is still entirely within the bed receiving feed air. If the second equalization step is carried out after the cocurrent depressurization step, the former may continue past the breakthrough point as the emerging gas is used for feed end repressurization. Breakthrough may for example be identified by monitoring the nitrogen concentration in the discharge gas, and detecting the moment at which this concentration appreciably increases. The purge step is most effficiently performed by removing only the adsorbables deposited in the preceding step. That is, the bed is not completely cleaned of all nitrogen by the purge fluid, but the latter's counter-current flow insures that the adsorption front is pushed back towards the inlet end. This insures a clean product during even the initial portion of the succeeding adsorption step.

The use of the FIG. 17 system to practice the four-bed embodiment will be more easily understood by reference to the FIG. 18 cycle and time program. There are six distinct steps each involving commencement and/or termination of flows. Streams flowing into and out of the four-bed system are indicated by vertical lines connecting the feed manifold 10, the unadsorbed product oxygen effluent manifold 11 and the desorbate waste nitrogen manifold 12. The feed manifold 10 connects vertically with each of the four adsorption steps and the latter in turn join vertically with the product manifold 11. The countercurrent depressurization and purge steps, during which the adsorbed nitrogen is discharged from the beds, are connected vertically with the desorbate waste manifold 12. The repressurization steps which use a portion of the unadsorbed product oxygen effluent are connected vertically with the product manifold 11. All gas flows associated with the four beds are identified on the Figure.

At least four adsorbent beds are needed to match, timewise, those steps in which cocurrent depressurization streams become available with those steps which can utilize these streams. Otherwise large holdup tanks would be required. It will be apparent from FIG. 18 that at any moment of time, one of the adsorbent beds is on its adsorption step delivering product at substantially constant pressure to the product manifold 11. At the same moment the other three beds are being cocurrently depressurized, or first or second stage pressure equalized, cleaned of the adsorbed component and/or repressurized respectively for the succeeding adsorption step. One of the beds is always receiving product gas for repressurization so that the consumption of product for this purpose is continuous rather than intermittent.

In FIG. 18 the utilization within the system of the pressure equalization and cocurrent depressurization gas is indicated by horizontal flow lines. Each first (I) pressure equalization step is connected horizontally with a repressurization step in another bed having already been partially repressurized, and each second (II) pressure equalization step is connected horizontally with a repressurization step of a different bed having just been purged. Each cocurrent depressuirzation step is connected horizonally with a purge step in a different bed.

Each step in the cycle of bed A will now be outlined and related to those components of FIG. 17 which are involved in the cycle changes. Pressures illustrative of such operation are included.

Time 0–60 seconds: Bed A is on adsorption at 40 psig. Valves 1A and 2A are open, and valves 3A, 4AB, 5A and 6A are closed.

Time 60–78 seconds: At the end of the adsorption step, valves 1A and 2A close, and valve 4AB opens to commence first-stage pressure equalization between beds A and second bed B. At this moment, all other valves associated with bed B are closed except valve 6B (valves 1B, 2B, 3B, 7B and 5). Valve 17 limits the flow rate of equalization gas to avoid bed fluidization, the direction being countercurrent to feed gas flow in bed B.

Time 78–102 seconds: When pressure in beds A and B have equalized at a higher intermediate level of about 26 psig, valve 4AB closes and valves 5A, 19 and 5C open allowing purge gas to flow from bed A into third bed C countercurrent to feed gas flow. At this moment, all other valves associated with bed C except valve 3C are closed (valves 2C, 1C, 4CD and 6C). Valve 23 throttles and limits the flow of purge gas so that bed C remains at substantially one atmosphere pressure.

Time 102–120 seconds: At the end of the purge step for third bed C, first bed A will have depressurized to about 16 psig. At this point, valve 3C closes so that the continued flow of gas from bed A into bed C is bottled up. The continued flow of gas cannot be carried by the purge crossover (conduit 21, valves 23 and 19) because the regulator valve 23 is set to terminate the purge flow when the pressure in bed A has dropped to the predetermined lower limit for the withdrawal of purge gas (e.g., 16 psig). Therefore, the continued gas flow for countercurrent pressurization of bed C is shunted through conduit 43 by opening valve 7C and closing valve 23. Beds A and C equalize at a lower intermediate pressure of about 8 psig.

Time 120–138 seconds: First bed A is now countercurrently depressurized to essentially one atmosphere pressure as the lowest pressure of the process by closing valve 5A and opening valve 3A. Valve 26 in the waste conduit 12 also closes forcing the blowdown gas through flow-restrictive device 25.

Time 138–162 seconds: Purge gas for first bed A is obtained from concurrent depressurization of fourth bed D which is between its two pressure-equalization steps. Valves 5A, 20 and 5D open to permit this flow countercurrent to the previously flowing feed gas. At this time, all valves associated with bed D other than valve 5D are closed. Valve 24 throttles and limits the flow of purge gas so that bed A remains at substantially one atmosphere. Valve 26 in the waste conduit 12 is also reopened so as to minimize flow resistance to the low-pressure purge gas.

Time 162–180 seconds: Bed A is now cleaned and ready to be repressurized concurrently. The initial phase of repressurization is accomplished by continued introduction of void space gas from fourth bed D. Valves 3A and 20 close and valve 7A opens to permit flow of gas from bed D to bed A. This partial concurrent repressurization of first bed A continues until it is pressure equalized with fourth bed D at lower intermediate pressure, e.g., about 8 psig. This is also the second or lower pressure equalization stage of bed D.

Time 180–198 seconds: The next phase of bed A repressurization is accomplished by higher pressure equalization with second bed B which has just completed its adsorption step and is initially at full feed pressure. Valves 5A and 7A close, and valve 4AB opens to admit void space gas discharged concurrently from bed B. Valve 17 limits the flow to prevent bed fluidization. This further countercurrent repressurization of first bed A continues until it is pressure equalized with second bed B at higher intermediate pressure, e.g., about 26 psig. This is the first or higher pressure equalization stage of bed B.

Time 198–240 seconds: The final phase of bed A repressurization to subtantially feed pressure is accomplished with product gas discharged from third bed C through manifold 11.

Although preferred embodiments of the invention have been described in detail, it is contemplated that modifications of the process may be made and that some features may be employed without others, all within the spirit and scope of the invention.

What is claimed is:

1. In an adiabatic pressure swing process for air separation by selectively adsorbing at least nitrogen alternately in at least two thermally isolated crystalline zeolitic molecular sieve adsorption beds of at least four Angstroms apparent pore size at ambient temperature by introducing feed air to the inlet end of a first adsorption bed at high pressure, discharging at least 60% oxygen from the discharge end, cocurrently depressurizing said first bed and terminating such cocurrent depressurization when the first bed is at lower pressure, and returning part of such oxygen from the cocurrent depressurization for repressurizaton of another purged adsorption bed, releasing waste gas from the first bed inlet end thereby countercurrently depressurizing same to a lowest pressure, introducing oxygen gas from another adsorption bed discharge end to the first bed discharge end as purge gas for desorption of the nitrogen adsorbate and discharging the adsorbate-containing purge gas from the first bed inlet end as waste gas, introducing oxygen gas from the discharge end of an other-than-first adsorption bed and at above said lowest pressure to the purged first bed for at least partial repressurization thereof, with the aforedescribed gas flows being such that a depressed temperature section is formed in the first bed inlet end wherein the coldest gas temperature is no warmer than 35° F and the temperature difference between said coldest gas temperature and a warmest gas temperature within the first bed is at least 50° F: the improvement comprising transferring heat to said inlet end by metal solid conduction from both the adsorbent inlet and the bed section downstream the inlet end at rate sufficient to maintain the gas flowing therethrough at temperature at least 20° F warmer than such gas without such metal solid conduction heat transfer but less than 110° F.

2. An adiabatic pressure swing process according to claim 1 wherein heat is transferred to said inlet end at rate of 15 to 150 BTU/hr./sq. ft. bed cross-sectional area.

3. An adiabatic pressure swing process according to claim 1 wherein sufficient heat is transferred to said inlet end to maintain the gas flow therethrough at maximum temperature between 60° F and 100° F.

4. In an adiabatic pressure swing process for air separation by selectively adsorbing at least nitrogen alternately in at least two thermally isolated crystalline zeolite molecular sieve adsorption beds of at least four Angstroms apparent pore size at ambient temperature by introducing feed air at temperature less than 90° F to the inlet end of a first adsorption bed at high pressure, discharging at least 60% oxygen from the discharge end, thereafter releasing additional oxygen from the first bed discharge end thereby cocurrently depressurizing said first bed and terminating such cocurrent depressurization when the first bed is at lower pressure, and returning part of said additional oxygen from the first bed for repressurization of another purged adsorption bed, releasing waste gas from the first bed inlet end thereby countercurrently depressurizing same to a lowest pressure, introducing oxygen gas from another adsorption bed discharge end to the first bed discharge end as purge gas for desorption of the nitrogen adsorbate and discharging the adsorbate-containing purge gas from the first bed inlet end as waste gas, introducing oxygen gas from the discharge end of an other-than-first adsorption bed and at above said lowest pressure to the purged first bed for at least partial repressurization thereof, with the aforedescribed gas flows being such that a depressed temperature section in the first bed inlet end wherein the coldest gas temperature is no warmer than 35° F and ,he temperature difference between said coldest gas temperature and a warmest gas temperature within the first bed is at least 50° F: the improvement comprising transferring heat to said inlet end by both an external heating source and also by metal solid conduction from both the adsorbent bed inlet and the bed section downstream the inlet end at rate sufficient to maintain the gas flowing therethrough at temperature at least 20° F warmer than such gas without said external heating source and said metal solid conduction heat transfer but less than 110° F.

5. An adiabatic pressure swing process according to claim 4 wherein the heat from an external source is supplied by introducing said feed air at temperature above ambient.

6. An adiabatic pressure swing process according to claim 5 wherein the feed air is compressed to said highest pressure and thereby warmed by the heat of compression, and thereafter partially recooled prior to inlet end introduction to remove only part of the compression heat.

7. An adiabatic pressure swing process according to claim 5 wherein the feed air is compressed to said highest pressure and thereby warmed by the heat of compression, the warmed compressed air is separated into a first part and a second part, and one of said parts is recooled to remove the compression heat and mixed with the unrecooled part prior to inlet end introduction.

8. An adiabatic pressure swing process according to claim 3 wherein the heat from an external source is by introducing external heating means to said inlet end.

9. In adiabatic pressure swing apparatus for air separation by selective adsorption of nitrogen comprising at least two thermally isolated zeolitic molecular sieve adsorbent beds of at least four Angstroms apparent pore size and at least 12 inches effective diameter circular cross-section, being arranged and conducted for alternate flow of feed air to the inlet end of each adsorbent bed at high pressure and discharge of at least 60% oxygen from the discharge end thereof: the improvement comprising a multiplicity of metallic elements in the form of aluminum $\frac{1}{32}$ to $\frac{1}{4}$ inch thick plates parallel to each other and equally spaced at 1½ to 8 inch intervals across the adsorbent bed cross-section and extending from the inlet of each adsorbent bed at least one-third the distance toward said discharge end having a total cross-sectional area A of $(X/K)(L/8)^2$ where $L$ is the adsorbent bed length (in feet), $K$ is the thermal conductivity of said metallic elements (in BTU/hr. ft.$^2$ °F/ft.), and $X$ is the product KA for an 8 foot long adsorbent bed with values between 0.5 and 12, said metallic elements also being spaced across the adsorbent cross-sectional area such that the distance between each adsorbent particle and the closest metallic element is less than 7 inches.

10. Apparatus according to claim 9 wherein the aluminum plates are provided with a multiplicity of openings through each plate in the axial direction.

11. Apparatus according to claim 9 wherein the aluminum plates are radially disposed in the axial direction with outer edges equally spaced around the perimeter of such adsorbent beds.

12. In adiabatic pressure swing apparatus for air separation by selective adsorption of nitrogen comprising at least two thermally isolated zeolitic molecular sieve adsorbent beds of at least four Angstroms apparent pore size and at least 12 inches effective diameter arranged and conducted for alternate flow of feed air to the inlet end of each adsorbent bed at high pressure and discharge of at least 60% oxygen from the discharge end thereof: the improvement comprising multiplicity of metallic elements in the form of aluminum rods of ¼ to 1 inch diameter positioned parallel to each other and uniformly spaced across said adsorbent beds at 0.01 to 0.10 square foot total cross-sectioned area per square foot of adsorbent area and extending from the inlet of each adsorbent bed at least one-third the distance toward said discharge end having a total cross-sectional area A of $(X/K)(L/8)^2$ where $L$ is the adsorbent bed length (in feet), $K$ is the thermal conductivity of said metallic elements (in BTU/hr. ft.$^2$ °F/ft.), and $X$ is the product KA for an 8 foot long adsorbent bed with values between 0.5 and 12, said metallic elements also being spaced across the adsorbent cross-sectional area such that the distance between each adsorbent particle and the closest metallic element is less than 7 inches.

* * * * *

UNITED STATES PATENT OFFICE
CERTIFICATE OF CORRECTION

Patent No. 4,026,680  Dated May 31, 1977

Inventor(s) J. J. Collins

It is certified that error appears in the above-identified patent and that said Letters Patent are hereby corrected as shown below:

Column 2, line 3; "front" should read --four--

Column 3, line 66; "separeted" should read --separated--

Column 5, line 13; "beb" should read --bed--

Column 5, line 41; "pruge" should read --purge--

Column 8, line 40; "20 F about" should read --20°F above--

Column 9, line 22; "And" should read --and--

Column 13, line 67; "in" should read --is--

Column 16, line 13; "tupe" should read --type--

Column 18, line 1; "valve" should read --valves--

Column 18, line 6; "of" should read --for--

Column 20, line 9; "oxygne" should read --oxygen--

Column 20, line 31; "zerolitic" should read --zeolitic--

Column 23, line 5; "pressure" should read --pressures--

Column 23, line 46; "concurrently" should read --cocurrently--

UNITED STATES PATENT OFFICE
CERTIFICATE OF CORRECTION

Patent No. 4,026,680           Dated May 31, 1977

Inventor(s) J. J. Collins

It is certified that error appears in the above-identified patent and that said Letters Patent are hereby corrected as shown below:

Column 23, line 50; "concurrent" should read --cocurrent--

Column 23, line 60; "concurrently" should read --cocurrently--

Signed and Sealed this

Thirteenth Day of June 1978

[SEAL]

Attest:

RUTH C. MASON
Attesting Officer

DONALD W. BANNER
Commissioner of Patents and Trademarks